United States Patent [19]
Chiba et al.

[11] Patent Number: 5,865,297
[45] Date of Patent: Feb. 2, 1999

[54] VIBRATORY PARTS-FEEDER

[75] Inventors: Yoshiteru Chiba, Toyohashi, Japan; Teruo Osa, deceased, late of Toyohashi, Japan, by Shizuko Osa, administrator; Toshiro Sekine; Hideyuki Takachu, both of Toyohashi, Japan

[73] Assignee: Shinko Electric Co., Ltd., Tokyo, Japan

[21] Appl. No.: 521,886

[22] Filed: Aug. 31, 1995

[30] Foreign Application Priority Data

Sep. 1, 1994 [JP] Japan ................................ 6-232002

[51] Int. Cl.⁶ .................................................. B65G 25/00
[52] U.S. Cl. .......................... 198/751; 198/762; 198/769
[58] Field of Search .................................... 198/751, 760, 198/761, 762, 769

[56] References Cited

U.S. PATENT DOCUMENTS

| | | |
|---|---|---|
| 4,216,416 | 8/1980 | Grace .................................. 198/762 X |
| 4,331,263 | 5/1982 | Brown .................................. 198/769 X |
| 4,395,665 | 7/1983 | Buchas ................................. 198/751 X |
| 4,811,835 | 3/1989 | Bullivant et al. ....................... 198/762 |
| 4,921,090 | 5/1990 | Gregor ................................ 198/769 X |
| 5,074,403 | 12/1991 | Myhre ..................................... 198/751 |
| 5,080,218 | 1/1992 | Izume et al. ............................. 198/751 |
| 5,158,170 | 10/1992 | Grengg et al. .......................... 198/751 |
| 5,314,058 | 5/1994 | Graham ................................... 198/753 |
| 5,472,079 | 12/1995 | Yagi et al. ............................... 198/762 |

*Primary Examiner*—D. Glen Dayoan
*Attorney, Agent, or Firm*—Carothers & Carothers

[57] ABSTRACT

In a vibratory parts-feeder, a bowl is combined with a base block by plural sets of single leaf spring. A controller is connected to an electro-magnetic coil of a drive part for the parts feeder. The bowl is torsionally vibrated nearly at a resonant frequency and at a desired amplitude with automatic or manual adjustment of the controller.

17 Claims, 19 Drawing Sheets

//5,865,297

VIBRATORY PARTS-FEEDER

BACKGROUND OF THE INVENTION

1. Field of the Invention

This invention relates to a vibratory parts-feeder, and more particularly to a vibratory parts-feeder in which a bowl is torsionally vibrated.

2. Description of the Prior Art

The vibratory parts-feeder is widely used for handling different parts. FIG. 1 shows one example of prior art vibratory parts-feeders. It is denoted generally by a reference letter P. A cylindrical bowl B is combined with a base block R by plural sets of piled leaf springs Q. The plural sets of the piled leaf springs Q are obliquely arranged at regular angular intervals of 90 degrees in this prior art arrangement. The upper ends of the piled leaf springs Q are fixed to the bowl B by bolts b and the lower ends of the piled leaf springs Q are fixed to the base block R by the bolts b. An electromagnet E on which a coil is wound, is fixed to the base block R. It is facing toward a movable core M fixed to the bowl B, and spaced by air gap S. The entire vibratory parts-feeder P is supported on the ground by vibration absorbing rubbers G.

When the coil is energized by an alternating current, the alternating vibratory force is generated to torsionally vibrate the bowl B. A not-shown spiral track is formed in the bowl B. Parts such as transistors, bolts and nuts are transported along the spiral track with the torsional vibration of the bowl B.

As shown in FIG. 2, each set of the piled leaf springs Q consists of three leaf springs a, b and c, contacted onto the slant Ba formed in the bottom portion of the bowl B. For the facilitation of the drawing, the three piled leaf springs a, b and c are exemplified. However, the number of the piled leaf springs is larger in the usual vibratory parts-feeder. Spacers d and e are interposed between the leaf springs a and b, and b and c. A contact plate f is contacted onto the front most leaf spring c. A bolt g is inserted through openings of the leaf springs a, b and c, spacers d and e and contact plate f into a threaded hole Bb of the bowl B. The bowl B is torsionally vibrated by vibratory force having a frequency near to a resonant frequency of the vibratory parts-feeder P. The resonant frequency is predetermined by a mass of movable parts including the bowl B and a total spring constant of the piled leaf springs Q. Usually, in order to obtain a resonant frequency near to the frequency of the vibratory force, the number of the leaf springs and the thickness of each leaf spring are adjusted or changed. As shown in FIG. 3, when the bowl B is torsionally vibrated, the piled leaf springs Q are twisted, and the node of the twisting is formed between the upper and lower ends of the piled leaf springs Q. The position of the node is determined by mass-ratio of the bowl B to the base block R. A large concentrated stress is imparted to the upper and lower ends of the leaf springs a, b and c. Accordingly, the leaf springs a, b and c are apt to be broken or damaged there. When the leaf springs a, b and c are broken or damaged, the piled leaf springs Q should be demounted and new leaf springs substituted. Such demounting and mounting operations of the piled leaf springs are troublesome and require much labor time.

On the other hand, this Assignee disclosed a control apparatus for a linear electromagnetic feeder in the Japanese publication number 7083/1987. The linear electromagnetic vibratory feeder controlled by the disclosed control apparatus is shown in FIG. 4. It is generally denoted by a reference letter F. A straight trough T, which is suspended from a stationary by coil springs q, is driven by a drive part D. It includes an electromagnet Y, piled leaf springs W and a drive transmitting portion N connected to a central portion of the piled leaf springs W. The piled leaf springs W are alternately bent with alternating vibratory force. The trough T is linearly vibrated through the transmitting portion N. Spacer plates are interposed between the leaf springs at both end portions. The piled leaf springs W are apt to be broken or damaged there. The mounting and demounting operations for substituting new leaf springs are troublesome and require much labor time.

SUMMARY OF THE INVENTION

Accordingly, it is an object of this invention to provide a vibratory parts-feeder which can be always vibrated nearly at a resonant frequency and demounting and mounting operations for substituting leaf springs are very simple.

Another object of this invention is to provide a vibratory parts-feeder in which the respective portions can be easily adjusted in position. In accordance with an aspect of this invention, in a vibratory parts-feeder which includes bowl means, a base arranged below said bowl means, plural sets of leaf spring means obliquely arranged at constant angular intervals for combining said bowl means and said base, and an electro-magnet fixed on said base, and in which said bowl means is vibrated torsionally with the energization of said electromagnet, the improvement in which said plural sets of leaf spring means each consist of one or two leaf springs, respectively, and a controller is connected to said electro-magnet, said controller comprising;

(a) an AC (Alternating current) →(to) DC (Direct current) convertor connected to an AC power source, (b) a DC→AC convertor connected to said AC→DC convertor, the AC output of said DC→AC convertor being supplied to said electro-magnet, (c) vibration-detecting means for detecting vibration of said bowl means, (d) phase-detecting means for detecting the phase difference between the outputs of said vibration-detecting means and said DC→AC convertor, and (e) comparator means for comparing a constant phase value of $\pi/2$ or nearly equal to $\pi/2$ with the output of said phase-detecting means, the frequency of the AC output of said DC→AC convertor being controlled with the output of said comparator means and the frequency of a vibratory force to said bowl means being so controlled as to be a resonant frequency or nearly equal to said resonant frequency, with the output of said comparator means.

In accordance with another aspect of this invention, in a vibratory parts-feeder which includes bowl means, a base arranged below said bowl means, plural sets of leaf sets of spring means obliquely arranged at constant angular intervals for combining said bowl means and said base, and an electro-magnet fixed on said base, and in which said bowl means is vibrated torsionally with the energization of said electro-magnet, the improvement in which said plural sets of leaf spring means each consist of one or two leaf springs, respectively, and a controller is connected to said electro-magnet, said controller comprising;

(a) an AC (Alternating current)→DC (Direct current) convertor connected to an AC power source, (b) a DC→AC convertor connected to said AC→DC convertor, the AC output of said DC→AC convertor being supplied to said electro-magnet, (c) vibration-detecting means for detecting vibration of said bowl, (d) phase-detecting means for detecting the phase difference between the output of said vibration-detecting means and said DC→AC convertor, (e) first comparator means for comparing a constant phase value of $\pi/2$ or nearly equal to $\pi/2$ with the output of said phase-detecting means, and (f) second comparator means for comparing the output of said vibration-detecting means with a predetermined amplitude, the frequency of the AC output of said DC→AC convertor being controlled with the output of said first comparator means, the frequency of a vibratory force to said bowl being so controlled as to be a resonant frequency or nearly equal to said resonant frequency with the output of said first comparator means, and the amplitude of said bowl being so controlled as to be equal or near equal to said predetermined amplitude with the level of the DC output of said AC→DC convertor.

In accordance with a further aspect of this invention, in a vibratory parts-feeder which includes bowl means, a base arranged below said bowl means, plural sets of leaf spring means obliquely arranged at constant angular intervals for combining said bowl means and said base, and an electro-magnet fixed on said base, and in which said bowl means is vibrated torsionally with the energization of said electro-magnet, the improvement in which said plural sets of leaf spring means each consist of one or two leaf springs, respectively, and a controller is connected to said electro-magnet, said controller comprising; (A) drive frequency-converting means, connected to an AC power source, and (B) output voltage regulating means, wherein the driving frequency for said electro-magnet is so controlled as to be nearly equal to a resonant frequency with the manual adjustment of said frequency-converting means, and the amplitude of said bowl means is so controlled as to be nearly equal to a desired amplitude with the manual adjustment of said output voltage regulating means.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENTS

Next, a vibratory parts-feeder according to a first embodiment of this invention will be described with reference to the drawings.

Figure 1:
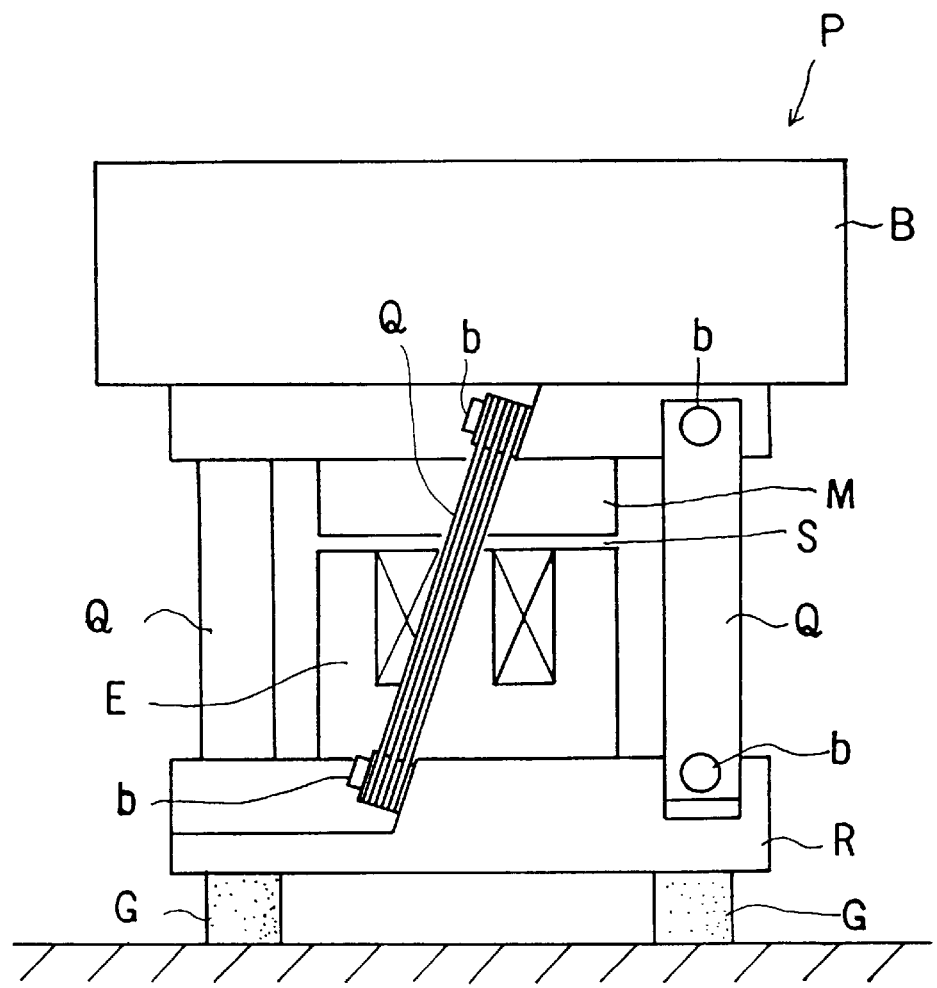
FIG. 1 is a side view of a Prior Art vibratory parts-feeder.
Figure 2:
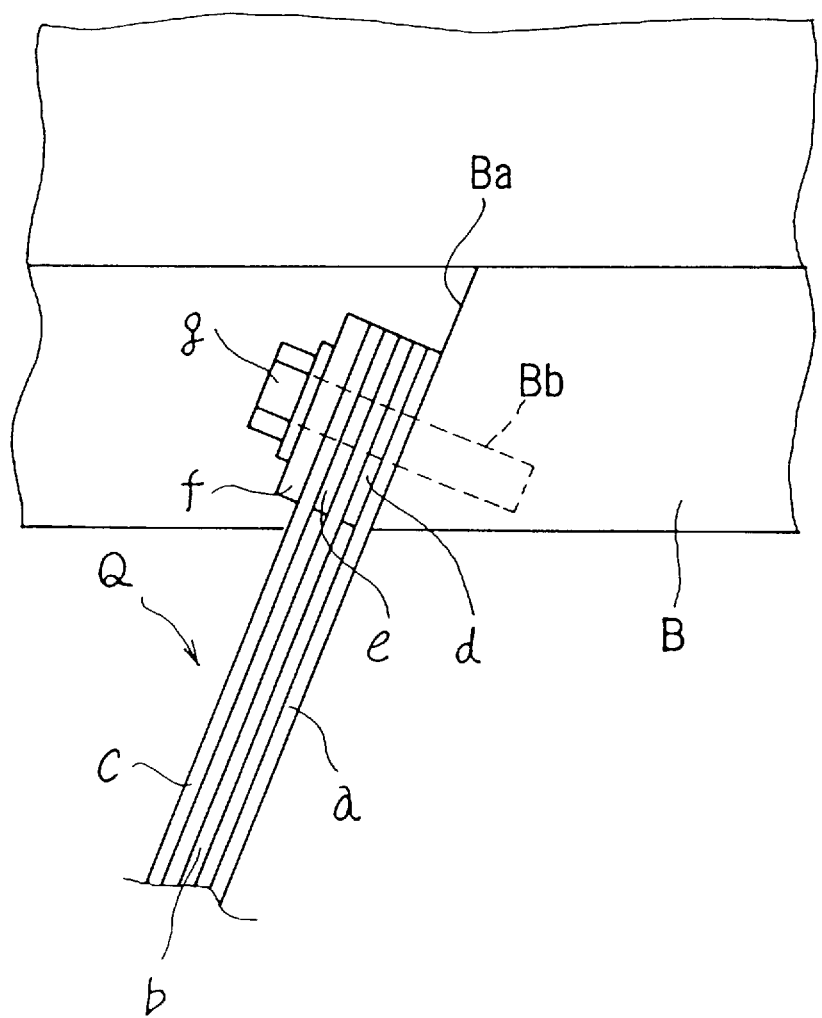
FIG. 2 is an enlarged partial view of leaf springs in the Prior Art vibratory parts-feeder.
Figure 3:
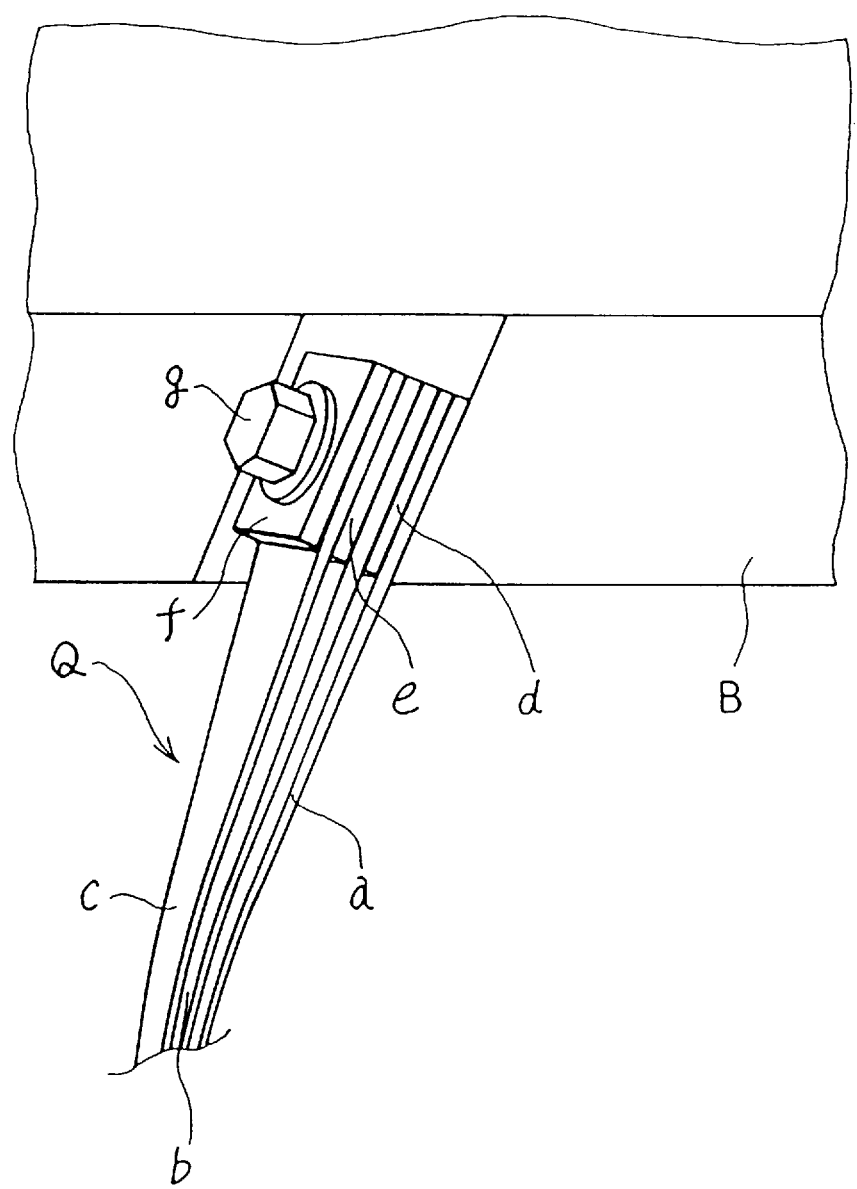
FIG. 3 is an enlarged partial view of the leaf springs of the parts feeder of FIG. 2 during vibration of the bowl.
Figure 4:
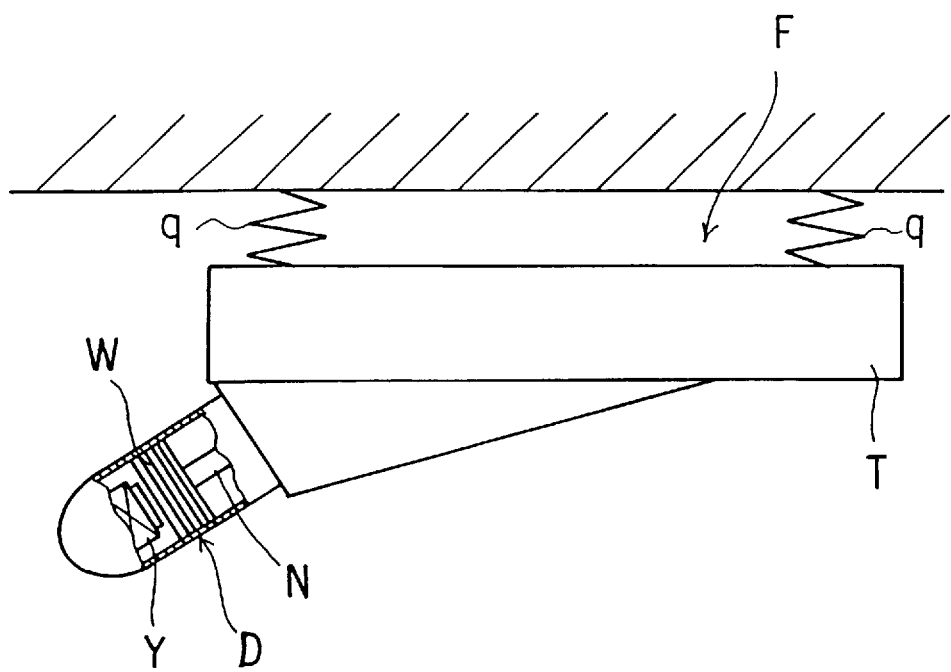
FIG. 4 is a side view of a linear vibratory feeder of the prior art.
Figure 5:
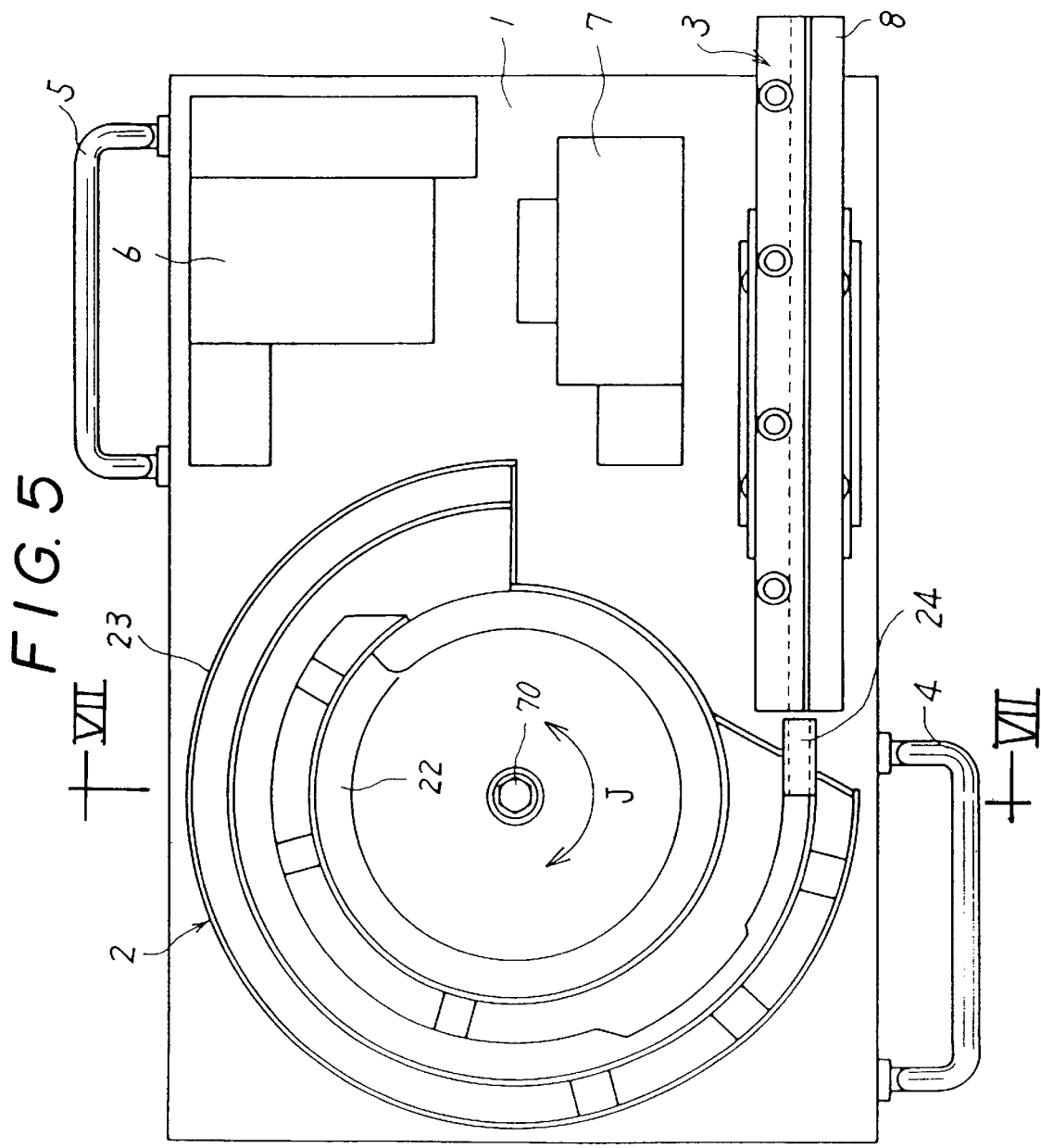
FIG. 5 is a plan view of a vibratory parts-feeder according to a first embodiment of this invention and a linear vibratory feeder adjacent to the vibratory parts-feeder fixed on a common base plate.
Figure 6:
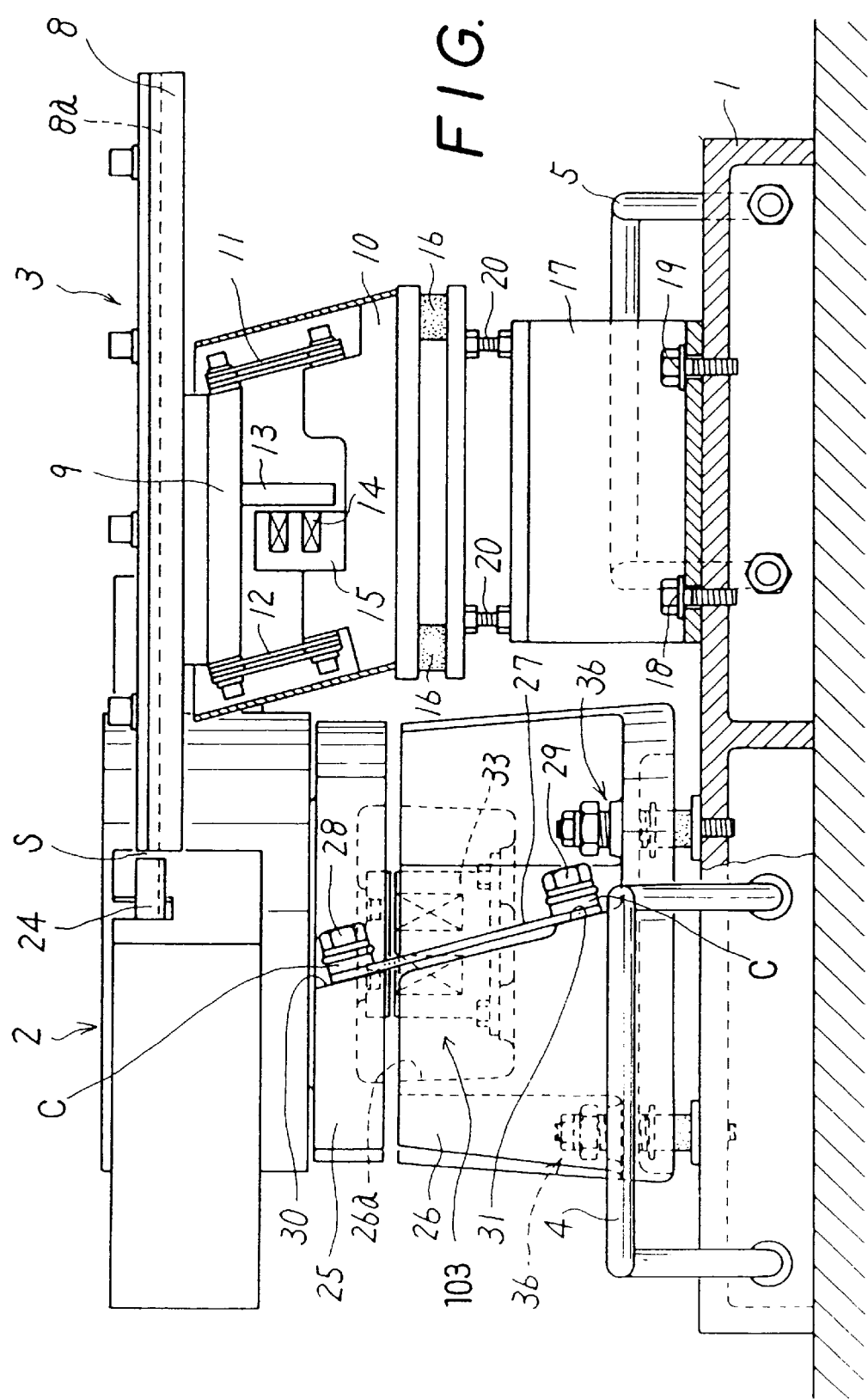
FIG. 6 is a partially broken-away right side view of the vibratory parts-feeder and the linear vibrating feeder shown in FIG. 5.

In FIG. 5 and FIG. 6, a vibratory parts-feeder 2 according to this invention and a linear vibratory feeder 3 are attached to a common base plate 1. Handles 4 and 5 are fixed to both sides of the base plate 1. Further, a control apparatus 6 and an electro-magnetic valve unit 7 are attached to the base plate 1.

The linear vibratory feeder 3 is constructed in the well-known manner. A leaf spring fixing block 9 fixed to a bottom of a straight trough 8 is combined with a base block 10 by a pair of leaf springs 11 and 12. An electro-magnet 15 on which coil 14 is wound, is fixed to the base block 10. A core 13 is downwardly fixed to the leaf spring fixing block 9. It is facing toward the electro-magnet 15, distanced from each other by an air gap. The linear vibratory feeder 3 is fixed to the base plate 1, through level adjusting bolts 20 and a base block 17. The base block 17 is fixed to the base plate 1 by bolts 18 and 19.

In the vibratory parts-feeder 2, a spiral track 22 is formed in a cylindrical bowl 21 and a pocket 23 is formed concentrically outward with the bowl 21. A discharge end 24 of the track is formed straight and it is aligned with a transport path 8a of the trough 8 of the linear vibratory feeder 3, spaced by spacing S, as shown in FIG. 6.

Figure 7:
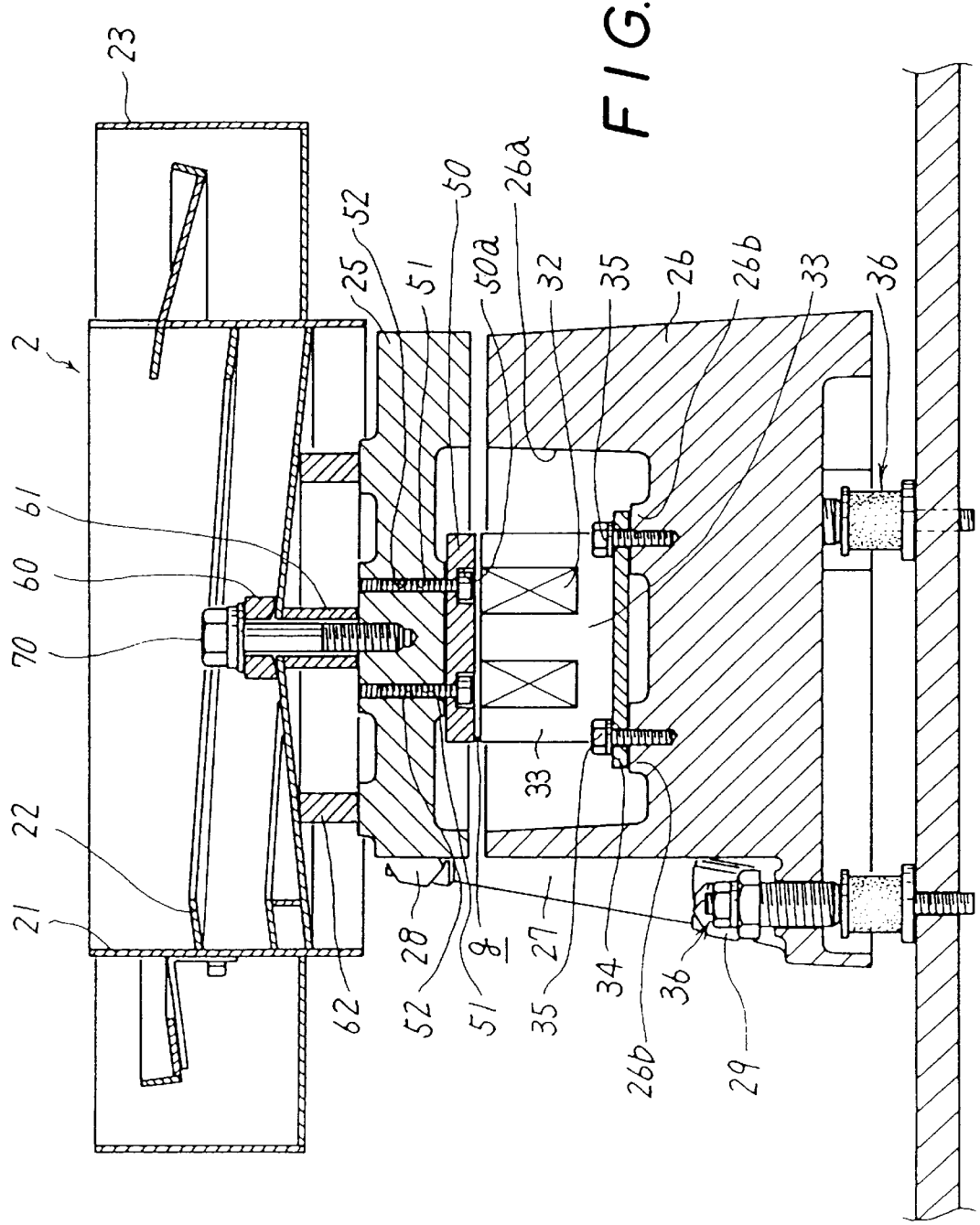
FIG. 7 is a cross-sectional partial view of the vibratory parts-feeder of FIG. 5 as seen along section lime VII–VII.
Figure 8:
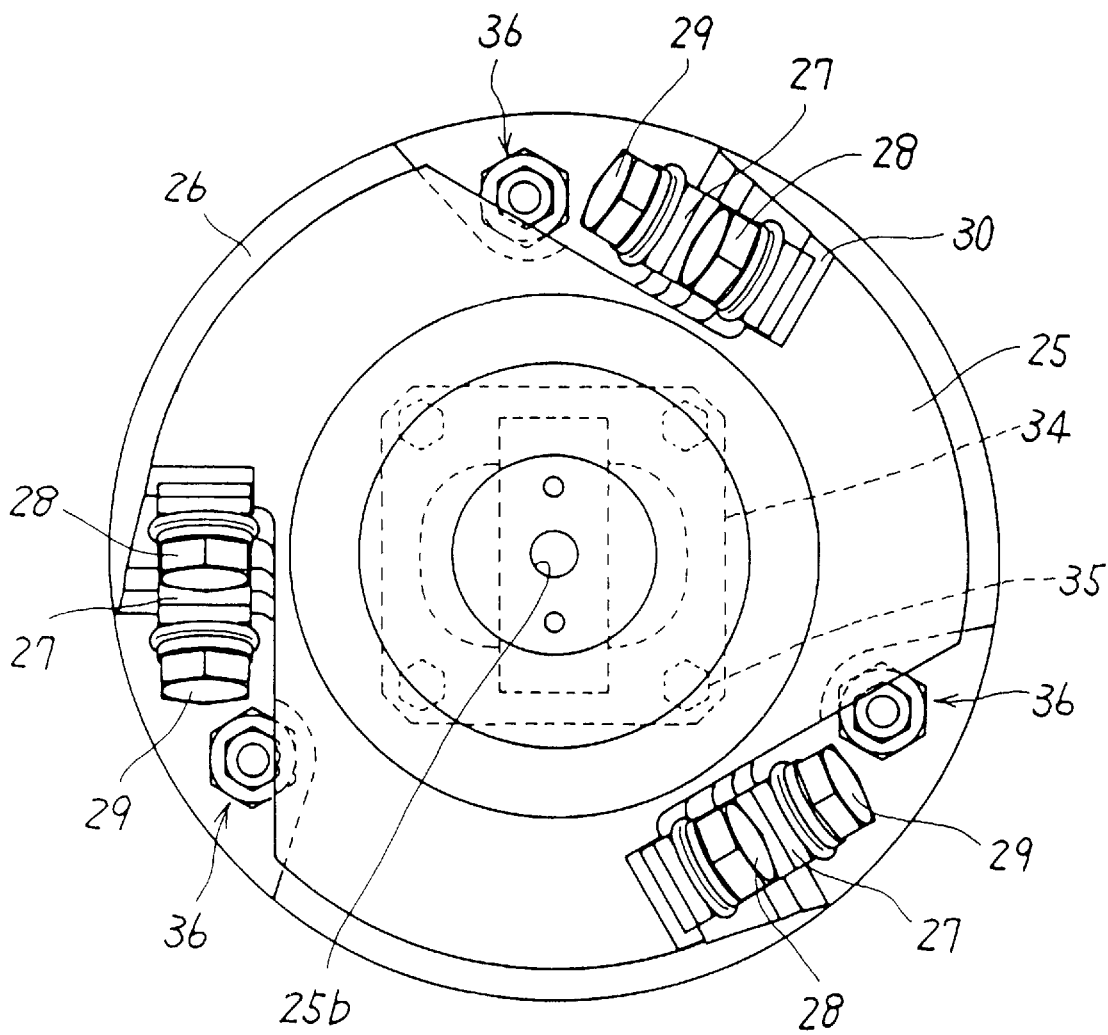
FIG. 8 is a plan view of the vibratory parts-feeder with the bowl omitted.

Referring additionally to FIGS. 7 through 8, an upper frame or mounting block 25 for fixing a movable core 50 is fixed to the bottom of the bowl 21. It is combined with a base block 26 by obliquely arranged leaf springs 27 which are arranged at the regular angular intervals of 120 degree according to this embodiment. The upper end of the leaf spring 27 is fixed to a slant 30 formed in the frame 25, by a bolt 28. The lower end of the leaf spring 27 is fixed to a slant 31 of the base block 26 by a bolt 29. A recess 26a is formed at a central part of the base block 26. An electro-magnet 33 on which a coil 32 is wound, is fixed to the projection part 26b of the base block 26. The movable core 50 is fixed to the upper frame: 25 by bolts 51. Round recesses 50a are formed in the movable core 50 to receive heads of the bolts 51. The bolts 51 are screwed to threaded holes 52 of the upper frame 25. An air gap g is maintained between the pole face of the movable core 50 of the upper frame 25 and the pole face of the electro-magnet 33.

Vibration absorbing rubber devices 36 are arranged at regular angular intervals of 120 degrees around the lower portion of the base block 26. Thus, the vibration is prevented from transmitting to the base plate 1.

Figure 9:
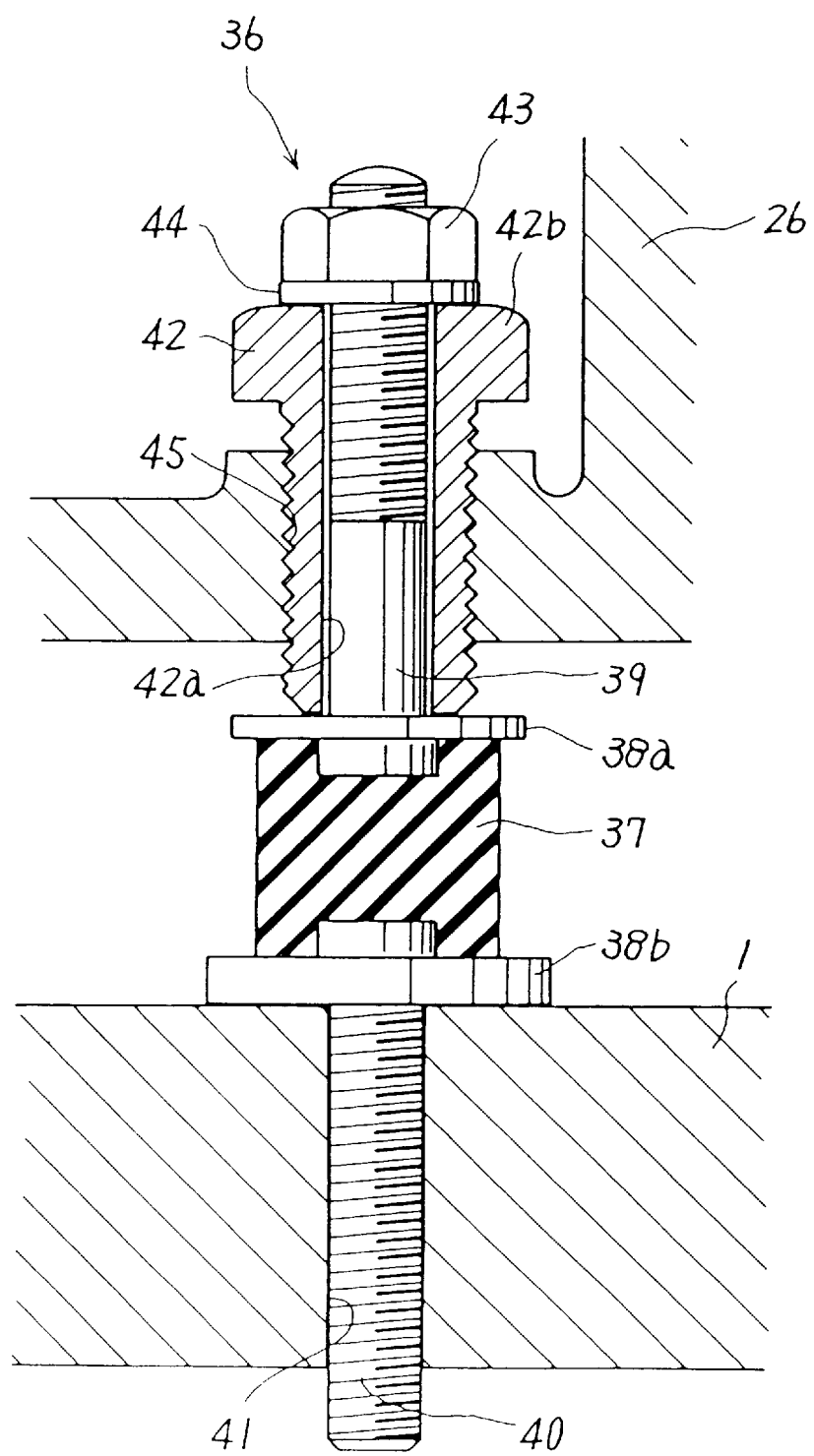
FIG. 9 is an enlarged cross-sectional view of a vibration absorbing device used in the above vibratory parts-feeder.
Figure 10:
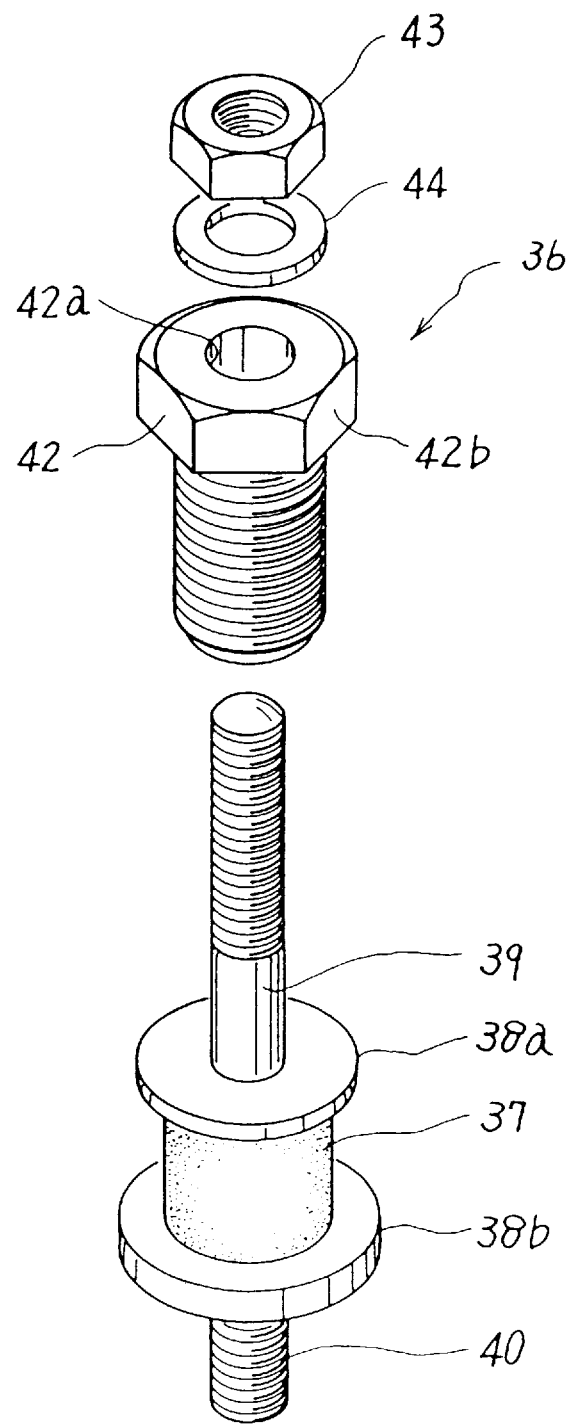
FIG. 10 is an exploded perspective view of the vibration absorbing device of FIG. 9.

As shown in FIG. 9 and FIG. 10, the vibration absorbing rubber devices 36 consist mainly of a cylindrical rubber body 37, respectively. Metal sheets 38a and 38b are adhered to the upper and lower surfaces of the rubber body 37. Rod-like bolts 39 and 40 are formed integrally with the metal sheets 38a and 38b. Through threaded holes 45 are formed at regular angular intervals of 120 degrees in the bottom of the base block 26. Level adjusting bolts 42 are screwed into the through threaded holes 45. The lower ends of the level adjusting bolts 42 are contacted with the upper metal sheets 38a. An axial through hole 42a is formed in the bolt 42. The rod-like bolt 39 is inserted through the axial through hole 42a of the bolt 42. The rod-like bolt 39 is projected from the bolt 42. The projected portion is engaged with a nut 43 through a metal washer 44. Thus, the vibration absorbing rubber devices 36 are assembled as one body as shown in FIG. 9, respectively. The rod-like bolt 40 is screwed into the treaded hole 41 to fix the base block 26 relative to the base plate 1.

Figure 11:
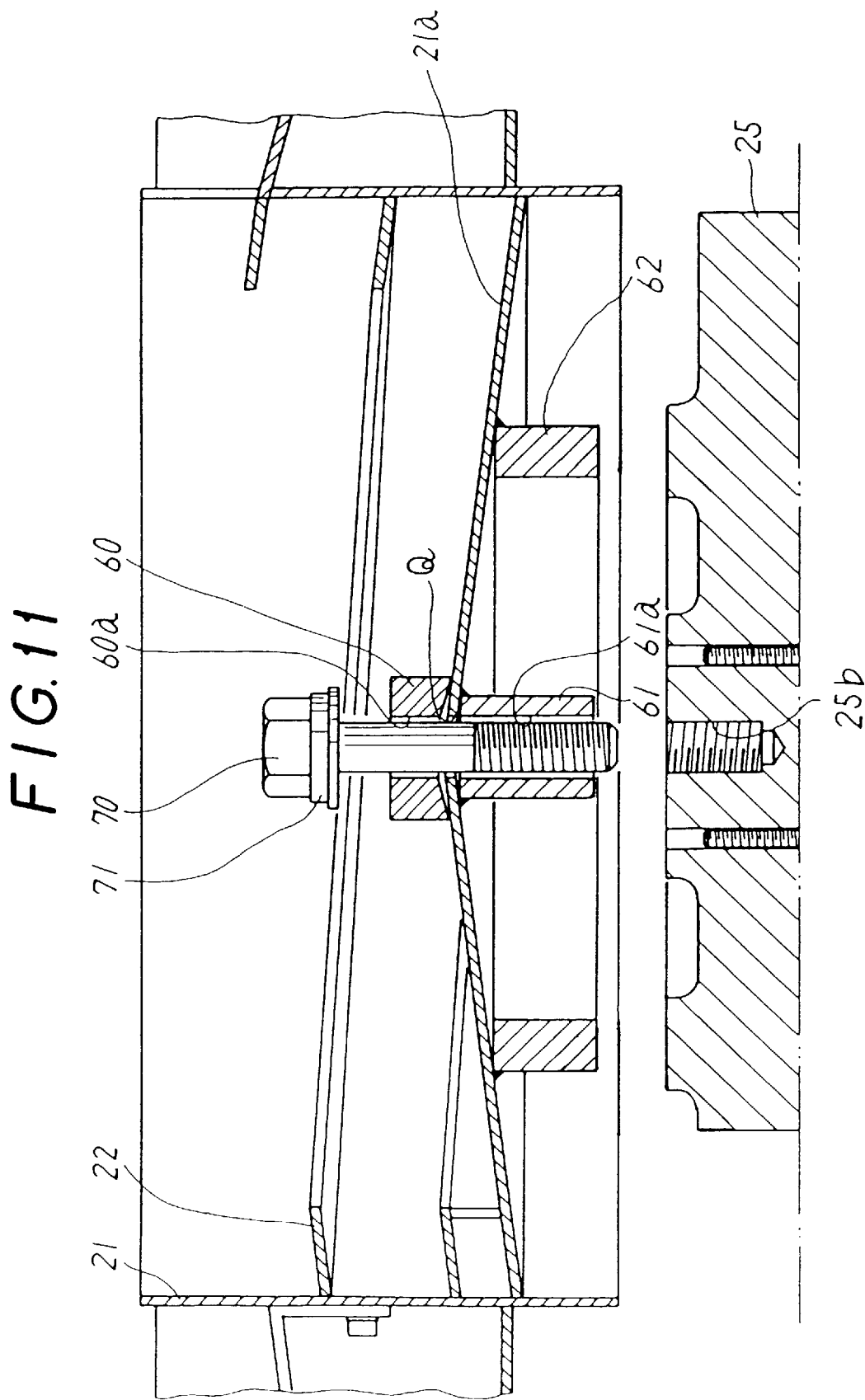
FIG. 11 is a partial enlarged cross-sectional view of the bowl in the vibratory parts-feeder of this embodiment of the present invention for explaining the mounting of the bowl to the frame of the vibratory parts-feeder.

Next, a mounting construction for fixing the upper or movable frame 25 to the bowl 21 will be described particularly with reference to FIG. 11. The bowl 21 is nearly cylindrical as above-described. A bottom 21a of the bowl 21 is short-conical. An opening Q is formed at the center of the bottom 21a of the bowl 21. A fixing block 60 is arranged in alignment with the central opening Q of the bottom 21a. A through hole 60a of the block 60 is aligned with the central opening Q of the bottom 21a. A cylindrical member 61 is welded to the lower surface of the bottom 21a of the bowl 21, concentric with the central opening Q. A ring member 62 is similarly welded to the lower surface of the bottom 21a, concentrically with the cylindrical member 61. A bolt 70 is inserted through a washer 71, the through hole 60a of the block 60 and the cylindrical member 61 into a threaded hole 25b formed in the center of the movable frame 25. It is screwed and fastened into the threaded hole 25b. Thus, the bowl 21 and the movable frame 25 are assembled as one body as shown in FIG. 7.

Figure 12:
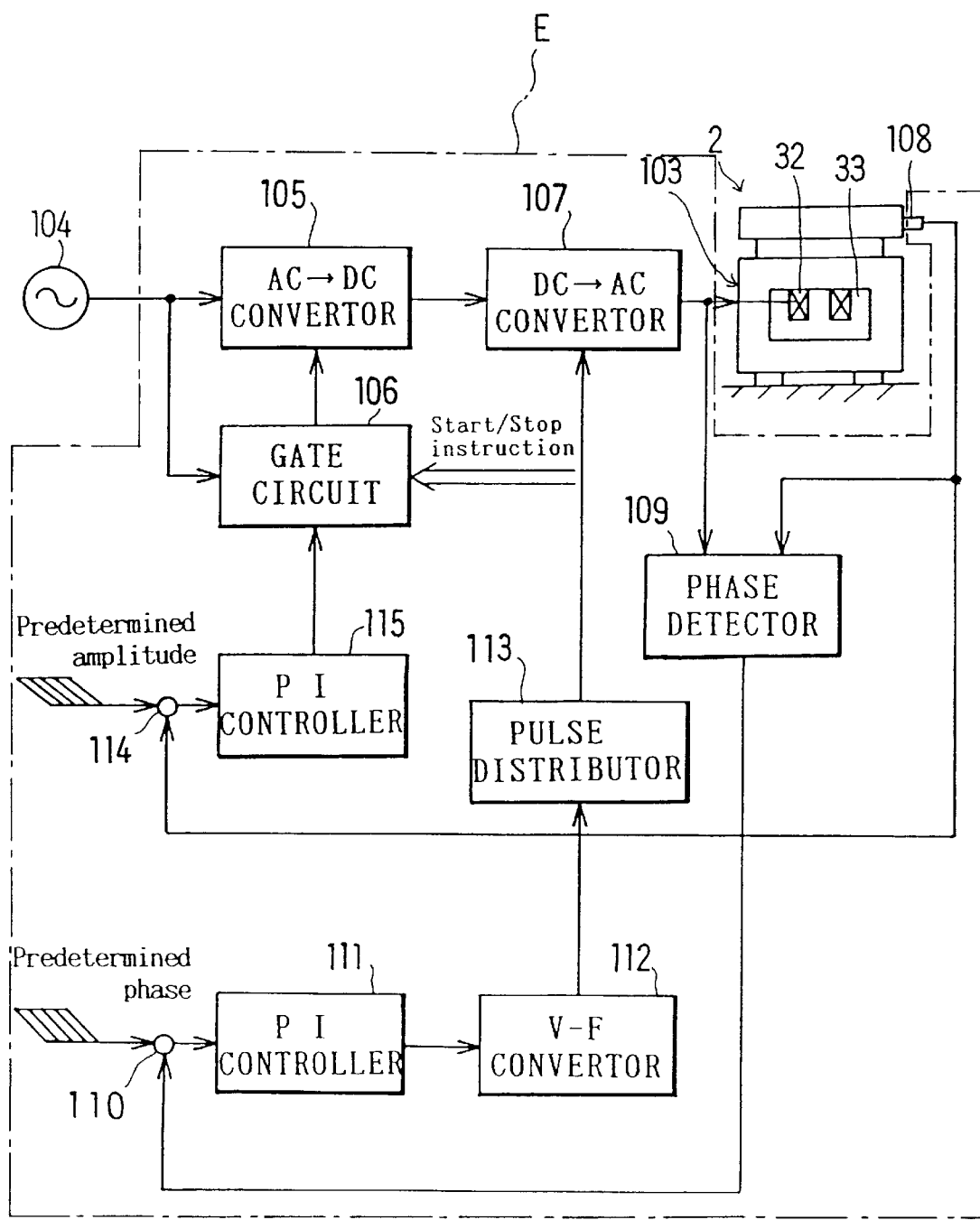
FIG. 12 is a block diagram of a control circuit for driving the above vibratory parts-feeder of the present invention.
Figure 13:
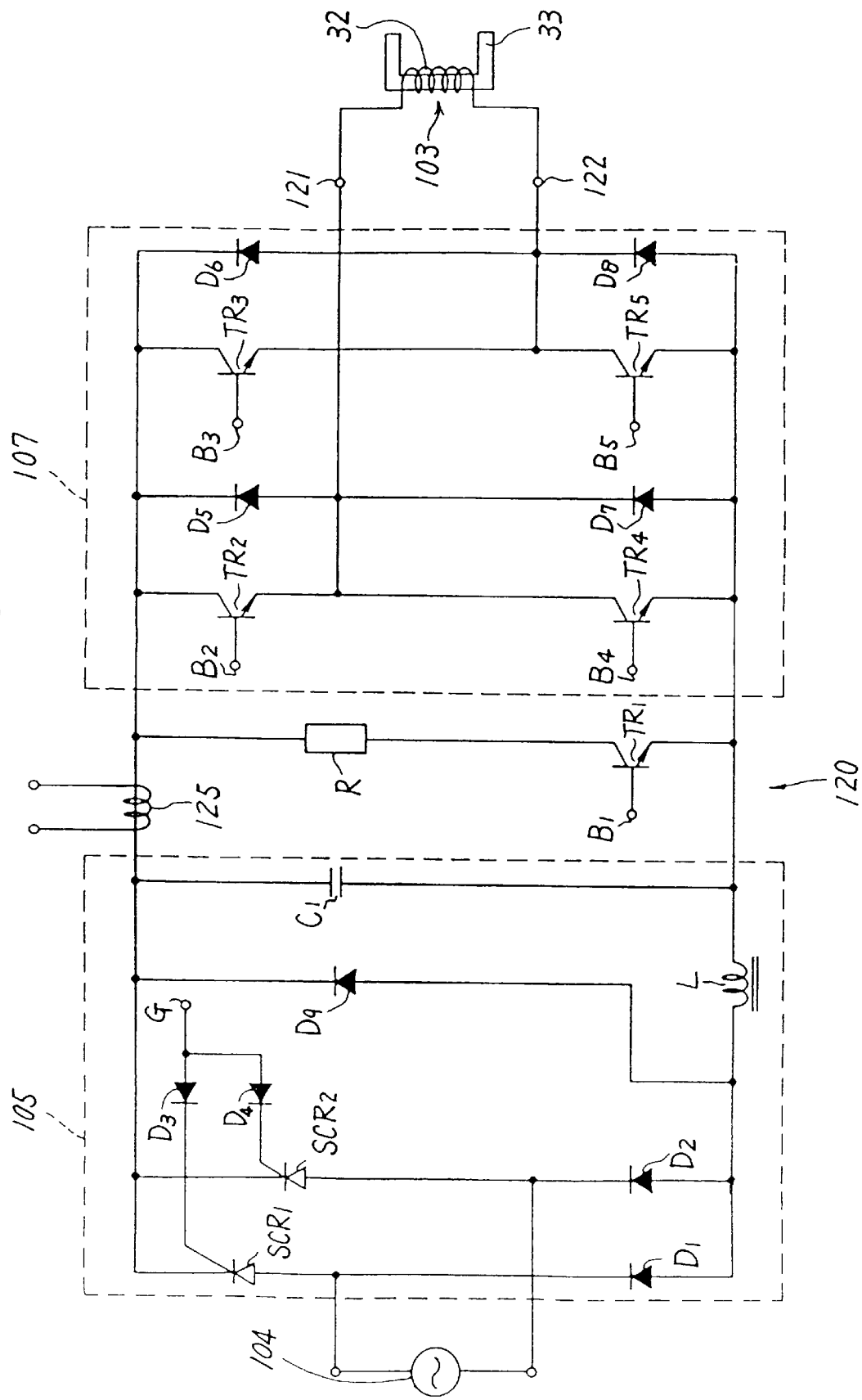
FIG. 13 is a detailed schematic circuit diagram of an important part of the block diagram of FIG. 12.

Next, a control circuit for the above-mentioned vibratory parts feeder 2 will be described with reference to FIG. 12 and FIG. 13. It is the same as the control circuit disclosed in the above Japanese publication number 7083/1987.

The control circuit E according to this embodiment consists mainly of an AC (Alternating Current)→(to) DC (Direct Current) convertor 105 connected to an AC commercial supply source 104, a gate circuit 106, a DC→AC convertor 107, an amplitude detector 108 attached to the bowl of the parts-feeder 2, a phase detector 109, a comparator 110, a PI (Proportional Integral) controller 111, a V-F convertor 112, a pulse distributor 113, a second comparator 114 and a PI controller 115. The gate circuit 106 is synchronized with the AC commercial power supply 104 and controls the DC output level of the AC→DC convertor 105. The DC→AC convertor 107 converts the DC output of the AC→DC convertor 105 to the AC output. The amplitude detector 108 detects the vibration or the amplitude of the bowl 21 of the vibrational parts-feeder 2. The phase detector 109 detects the phase difference between the AC output of the DC→AC convertor 107 and the output of the amplitude detector 108. The comparator 110 compares the output of the phase detector 109 with a predetermined phase. The PI controller 111 receives the output of the comparator 110. The V-F convertor 112 receives the output of the PI controller 111 and generates pulses of frequency in accordance with the output of the PI controller 111. The pulse distributor 113 distributes the output pulses of the V-F convertor 112 to four transistors in the DC→AC convertor 107. The comparator 114 compares the output of the amplitude detector 8 with a predetermined amplitude. The PI controller 115 receives the output of the comparator 114 and controls the gate circuit 100.

The output of the PI controller 115 is supplied to the gate circuit 106 and controls the phase of the gate pulses to the AC→DC convertor 105. Accordingly, an AC output of frequency in accordance with the output of the amplitude detector 108 and the output of the phase detector 109 is obtained from the DC→AC convertor 107. It is supplied to an electro-magnetic coil 32 of the drive part 103 of the vibratory parts-feeder 2. The drive part 103 generates a vibratory force of the frequency of the AC output in accordance with the level of the AC output.

Next, the detail of the above mentioned AC→DC convertor 105 and the DC→AC convertor 107 will be described with reference to FIG. 13.

In the AC→DC convertor 105, a bridge circuit is constituted by diodes $D_1$ and $D_2$ and thyristors $SCR_1$ and $SCR_2$. The AC commercial supply source 104 is connected to the bridge circuit. The gate pulses from the gate circuit 106 in FIG. 12 are supplied through the gate signal supply terminal G and diodes $D_3$ and $D_4$ to gate terminals of the thyristors $SCR_1$ and $SCR_2$. The firing angles or conduction phases of the thyristors $SCR_1$ and $SCR_2$ are controlled by the gate pulses, and the rectified output is obtained from the bridge circuit. It is smoothed by a smoothing circuit which is constituted by a diode $D_9$, a reactor L and a capacitor $C_1$. The DC output is supplied through a protecting circuit 120, which is not shown in FIG. 12, to the DC→AC convertor 107.

In the DC→AC convertor 107, transistors $TR_2$ and $TR_5$ constitute one pair, and transistors $TR_3$ and $TR_4$ constitute another pair. Diodes $D_5$ to $D_8$ for absorbing over-voltage are connected in parallel with the transistors $TR_2$ to $TR_5$, respectively. A connecting point between the transistors $TR_2$ and $TR_4$ and another connecting point between the diodes $D_5$ and $D_7$ are connected to one terminal 121 of the electro-magnetic coil 32 of the drive part 103 in the vibratory parts-feeder 2. A connecting point between the transistors $TR_3$ and $TR_5$ and another connecting point between the diodes $D_6$ and $D_8$ are connected to another terminal 122 of the electro-magnetic coil 32 which is wound on the iron core 33 in the well-known manner. Rectangular pulses are supplied as base signals to base terminals $B_2$ to $B_5$ of the transistors $TR_2$ to $TR_5$ from the pulse distributor 113 which is shown in FIG. 12. The base signals are alternately supplied to the base terminals $B_2$ and $B_5$ of the transistors $TR_2$ and $TR_5$ and the terminals $B_3$ and $B_4$ of the other paired transistors $TR_3$ and $TR_4$. Accordingly, when the one paired transistors $TR_2$ and $TR_5$ are in the conductive states, the other paired transistors $TR_3$ and $TR_4$ are in the non-conductive states. Further, when the one paired transistors $TR_2$ and $TR_5$ are the non-conductive states, the other paired transistors $TR_3$ and $TR_4$ are in the conductive states.

The protecting circuit 120 consists of a detecting coil 125 wound on an electric wire and a serial circuit of a resister R and a transistor $TR_1$. When an over current is detected by the detecting coil 125, the gate pulse is interrupted from the gate signal supply terminal G in the AC→DC convertor 105, and the base signal is interrupted from the base terminals $B_2$ to $B_5$ of the transistors $TR_2$ to $TR_5$ in the DC→AC convertor 107. At the same time, a base signal is supplied to a base terminal $B_1$ of the transistor $TR_1$ and so it becomes conductive. As the result, the electric charge in the capacitor $C_1$, in the AC→DC convertor 105 is discharged through the resister R. Accordingly, the respective circuit parts are protected from the over current. Instead, the voltage between the terminals of the capacitor $C_1$ may be detected to detect the over voltage for protecting the respective parts.

Figure 14:
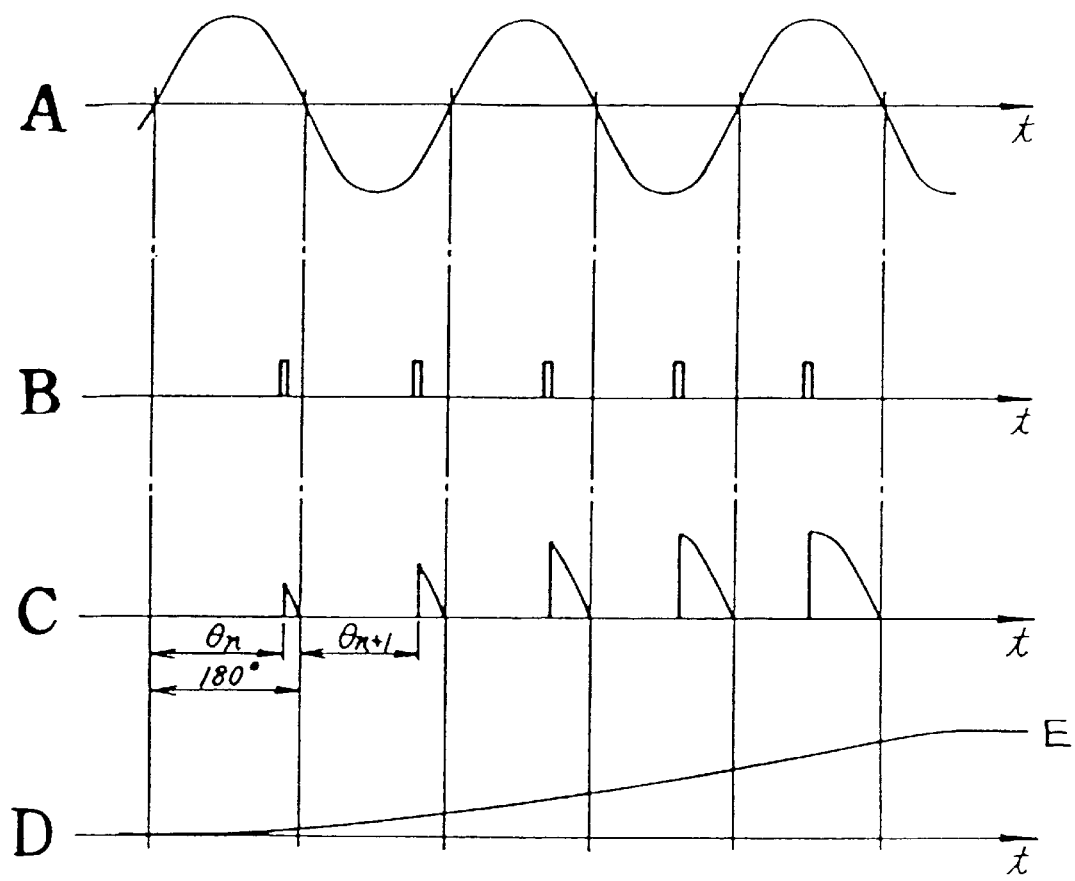
FIG. 14 Provides graphs for explaining operations of the control circuit of FIG. 12.

The gate circuit 106 according to this embodiment is so designed as to be described below. Although not shown, when a starting button is depressed, a start instruction signal is supplied to the gate circuit 106 and so gate pulses as shown in FIG. 14B are generated from the gate circuit 106. FIG. 14A to FIG. 14D show the changes of the respective signals directly after starting the control apparatus E. The voltage of the AC commercial supply voltage source 104 is shown in FIG. 14A. The phase θ of the gate pulses is so designed as to change as θ=180° $-k_1$ t (t : time, $k_1$: constant) with reference to the zero points of the commercial supply voltage, where it intersects with the time axis. As shown in FIG. 14C, the rectified output of the bridge circuit constituted by the thyristors $SCR_1$ and $SCR_2$, diodes $D_1$ and $D_2$, is so designed as to change as $θ_n > θ_{n+1}$ > . . . . A phase θ decreases at the rate $k_1$ until the value of the phase θ reaches a predetermined value α. The predetermined value α is determined by the predetermined amplitude set in the comparator 114. Although not shown, when a stop button is depressed, a stop instruction is imparted to the gate circuit 106. The gate circuit 106 is so constructed that the phase θ changes as θ=α+$k_1$ t, on stop instruction until, the phase θ reaches 180 degrees.

Figure 15:
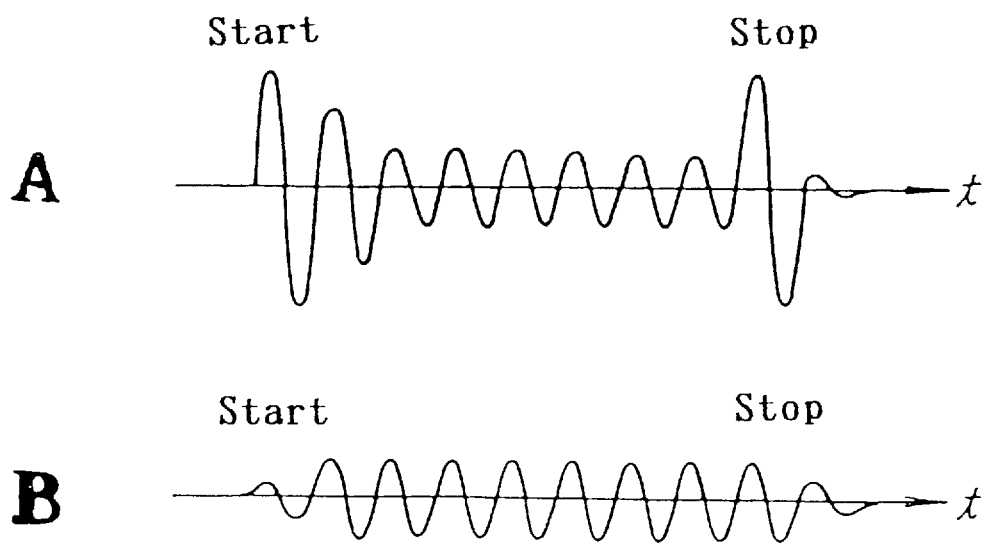
FIG. 15 displays wave forms of amplitude of the bowl of the vibratory parts-feeder on starting and stopping in the Prior Art and this embodiment.

The above multiplier constant $k_1$ is determined in consideration of the following points. Generally, when a vibratory force of one frequency is imparted to a vibratory machine and it is cut from the vibrating machine, it vibrates transiently as shown in FIG. 15A on starting and on stopping in accordance with a viscous coefficient of the vibratory system and its natural or resonant frequency. Accordingly, directly after starting and directly after stopping, the amplitude is very large and at some time, becomes a constant value and zero. However, the, transient state often has a bad influence on the operations of the vibratory machine. In this embodiment, the constant $k_1$ is so designed that the vibratory machine starts and stops smoothly as shown in FIG. 15B.

A rectified output is obtained from the bridge circuit in the AC→DC convertor 105 with the gate pulses as shown in FIG. 14C. It is smoothed by the smoothing circuit and so the DC voltage as shown in FIG. 14D is obtained from the AC→DC convertor 105. When the phase θ of the gate pulses becomes α, the DC voltage becomes the constant value E. E is nearly equal to $k_2$ α, where $k_2$ represents a constant. The amplitude is Definitely determined by the level of the value E. As a result, the amplitude of the bowl 22 is determined by the value α.

Next, a phase value set in the comparator 110 will be described.

Generally, the following relationship is obtained between the vibratory force generated by the drive part 103 of the vibratory parts-feeder 2 and the amplitude of the bowl 21: Tan δ=(2γλ)/(1−λ), where γ represents the viscous resistance coefficient of the vibratory system and λ=f/$f_0$=(the frequency of the vibratory force) / (the resonance frequency of the vibratory system).

Therefore, when f is equal to $f_0$, therefore, λ is equal to 1, the vibratory machine is in natural frequency vibration. At that time, δ is equal to π/2 from the above formula. And λ→0 and δ→0. And λ→∞ and δ→π. Accordingly, with the increase of the frequency f, it changes as 0→π/2→π. The change mode depends on the viscous resistance γ. When γ is equal to 0, and f is equal to $f_0$, δ changes to π from 0, stepwisely. However, because it is actually not zero, δ is equal to π/2 in the resonant condition. However, according to this embodiment, a phase value slightly smaller than π/2 is set in the comparator 110 in consideration of the stability of the control.

The electro-magnet coil 32 is energized by the AC output of the DC→AC convertor 107, and an alternating attractive force or a vibratory force is generated. The phases of the AC output and vibratory force are equal to each other.

There has been described the vibratory parts-feeder 2 according to the first embodiment of this invention. Next, driving operations and assembling operations of the vibratory parts-feeder 2 will be described.

According to this invention, the base block 26 and the movable frame 25 are combined with each other by single leaf springs 27 arranged at angular regular intervals. Since the single leaf springs are not piled, respectively, the assembling operations are very simple. No spacer is used, although a contact plate C is contacted with the leaf spring 27.

As shown in FIG. 7, the fixing block 60 is so arranged as to be in alignment with the central opening of the bowl 21. The bolt 70 is inserted through the washer 71 into the central hole 60a of the block 60 and through the hole 61a of the cylindrical member 61 and it is screwed into the threaded hole 25b of the movable frame 25. The bottom 21a of the bowl 21 is downwardly bent or curved with screw pressure of the bolt 70 and it comes into contact with an upper surface of the movable frame 25. Thus, the bowl 21 is fixed to the movable frame 25 by the determined force.

Further since the bolt 70 is inserted through the central opening Q of the bottom 21a of the bowl 21, the bowl 21 is rotatable around the central opening Q as shown by the arrow J, before the bolt 70 is fastened. Accordingly, the discharging end 24 of the track of the bowl 21 can be easily and accurately so positioned as to be in alignment with the end of the trough 8 of the linear feeder 3.

The movable core 50 is fitted into the recess 50a of the movable core 50 and the bolts 51 are screwed into the threaded holes 52 of the movable frame 25. Thus, the movable core 50 and the movable frame 25 are combined with each other as one body. The single leaf springs 27 are contacted with the slants 30, 31 of the movable frame 25 and base block 26, and the bolts 28, 29 are screwed through the contact plate into the threaded holes of the slants, and they are fixed to combine the movable frame 25 and base block 26 as one body. A spacer is not required to be inserted between leaf springs and so the assembling operation is very simple. The rod-like bolt 40 is formed integrally with the lower metal sheets 38b attached to the vibration absorbing rubber body 37 of the vibration absorbing rubber devices 36. It is screwed into the threaded hole 41 of the base plate 1. It is positioned and fixed to the base plate 1 as shown in FIG.

9. The upper rod-like bolt 39 is inserted through the axial through hole 42a of the level adjusting bolt 42 and the nut 43 is screwed through the washer 44 to the projected portion of the upper rod-like bolt 39. Thus, the base block 26 is fixed to the base plate 1. Before the nut 43 is fastened, the level adjusting bolt 42 is adjusted to move the base block 26 upwards and downwards so that the transport surface 8a of the trough 8 of the linear vibratory feeder 3 is aligned through the gap S with the discharging end 24 of the track and the entire bowl 21 is put into the horizontal condition. Accordingly, with the adjustment of the level adjusting bolts 42, the bowl 21 is put into the horizontal condition and the end 24 of the transport surface of the spiral track is made flash with the transport surface 8a of the linear vibratory feeder 3.

In this embodiment, the deep recess 26a is formed in the base block 26 and it receives the electro-magnet 33. Accordingly, any cover for covering the torsional drive part 103 is not required and so the assembling steps and the number of the parts can be decreased.

According to this embodiment, the relative level between the vibratory parts-feeder 2 and linear vibratory feeder 3 can be very accurately adjusted and the vibratory parts-feeder 2 or the base block 26 can be accurately positioned to the base plate 1. When the user carries the base plate 1 with the handles 4 and 5, the relative position of the vibratory parts-feeder 2 to the linear vibratory feeder 3 is not changed and so after it is transported to the predetermined place for example, by a truck, the vibratory parts-feeder 2 and the linear vibratory feeder 3 can be used, as it is, without problem and adjustment.

The vibration absorbing rubber body 37 of the vibration absorbing rubber device 36 is simple in construction in comparison with the Prior Art vibration absorbing rubber. Further, it can be more easily positioned to the base plate 1. And after positioned, the vibratory parts-feeder 2 and linear vibratory feeder 3 are not moved relative to the base plate during transporting.

Next, operations of the above described control apparatus E will be described.

When the not-shown start button is depressed, the start instruction signal is supplied to the gate circuit 106. The gate signal as shown in FIG. 14B is supplied to the gate terminals of the thyristors $SCR_1$ and $SCR_2$ in the AC→DC convertor 105. Thus, the rectified output as shown in FIG.14C is obtained from the bridge circuit. It is smoothed by the smoothing circuit. The output as shown in FIG. 14D is obtained from the AC→DC convertor 105 and it is supplied to the DC→AC convertor 107.

The pulses of the frequency which changes in accordance with the difference between the output of the phase detector 109 and the preset phase value, are obtained from the pulse distributor 113 and they are supplied alternately to the base terminals $B_2$, $B_5$ of the transistors $TR_2$, $TR_5$ and the base terminals $B_3$, $B_4$ of the transistors $TR_3$, $TR_4$ in the DC→AC convertor 107. When the pulses are supplied to set of paired transistors $TR_2$ and $TR_5$, they are put into the conductive state. A current flows through the transistor $TR_2$→the terminal 121→the electro-magnetic coil 32→the terminal 122→the transistor $TR_5$ to energize the coil 32. And when the pulses are supplied to the other paired transistors $TR_3$ and $TR_4$, they are put into the conductive state. Another current flows through the transistor $TR_3$→the terminal 122→the electro-magnetic coil 32→the terminal 121→the transistor $TR_4$ to energize the electro-magnetic coil 32. Thus, an alternating current is generated in accordance with the level of the DC output of the AC→DC convertor 105. An alternative attracting force is generated from the electro-magnet 33 with the above described alternating current and the bowl 21 is torsionally vibrated.

On starting, the DC output as shown in FIG. 14D is supplied to the DC→AC convertor 107. Thus, the bowl 21 is very stably started to vibrate as shown in FIG. 15B. In a short time, the DC output of the AC→DC convertor 105 reaches the level E depending on the preset amplitude. If the DC level E would be supplied to the DC→AC convertor 107 concurrently with starting, the bowl 21 vibrates in a transient manner as shown in FIG. 15A. Such a vibration has a bad influence on the operation of the bowl 21.

The phase detector 109 generates the output detecting the phase difference between the alternating output of the DC→AC convertor 107 and the output of the amplitude detector 108. It is compared with the preset phase value which is slightly smaller than $\pi/2$ according to this embodiment, in the comparator 110. The difference is supplied to the PI controller 111 and the difference is so controlled as to be zero in the PI controller 111. Accordingly, the bowl 21 vibrates nearly at the resonant frequency.

On the other hand, the output of the amplitude detector 108 is compared with the preset amplitude in the comparator 114 and the difference is so controlled as to become zero in the PI controller 115. The pulses of the controlled phase are supplied to the AC→DC convertor 105. Thus, the DC output depending on the preset amplitude is obtained from the convertor 105. Accordingly, the bowl 21 is torsionally vibrated at the predetermined amplitude.

In the above described manner, the bowl 21 is vibrated nearly at the resonant frequency and at the predetermined amplitude. Now, when the parts are supplied into the bowl 21, the parts are transported along the spiral track 22 in the bowl 21. They are one by one discharged from the end of the spiral track 22. When the load is thus imparted to the bowl 22, the amplitude of the bowl 21 becomes small. However, according to this embodiment, the amplitude of the bowl 21 is detected by the amplitude detector 108 and it is compared with the preset amplitude in the comparator 114. It is so controlled as to be equal to the predetermined amplitude. The DC output to obtain the predetermined amplitude is generated from the AC→DC convertor 105. Thus, the bowl 21 is vibrated at the predetermined amplitude even under the load condition.

When the not-shown stop button is depressed to stop the vibration of the bowl 21, the stop instruction signal is supplied to the gate circuit 106. Accordingly, the phase $\theta$ of the gate signal is so controlled as to obtain the formula $\theta = \alpha + k_1 t$, where $\alpha$ represents the constant for the stationary condition of no-load. Accordingly, the gate signal changes in a manner inverse to the graph of FIG. 14B, with respect to time, and the rectified output of the bridge circuit in the AC→DC convertor 105 changes in a manner inverse to the graph of FIG. 14C. Accordingly, the DC output of the AC→DC convertor 105 changes in the manner inverse to the chart of FIG. 14D. It approaches zero with time. Thus, the bowl 21 stops stably in the manner as shown in FIG. 15B. If the DC level E would be instantaneously changed to zero, the bowl 21 is vibrated in the transient manner as shown in FIG. 15A.

When an over current flows during the the driving of the bowl 21 for any cause, it is detected by the detecting coil 125 in the protection circuit 120. The base signal is supplied to the base terminal $B_1$ of the transistor $TR_1$ and the transistor $TR_1$ is put into the conductive state. Thus, the electric charge is discharged through the resistor R from the capacitor $C_1$. The gate signals are interrupted from the gate terminals of the thyristors $SCR_1$ and $SCR_2$. The base signals are cut from the base terminals $B_2$ to $B_5$ of the transistor $TR_2$ to $TR_5$.

Figure 16:
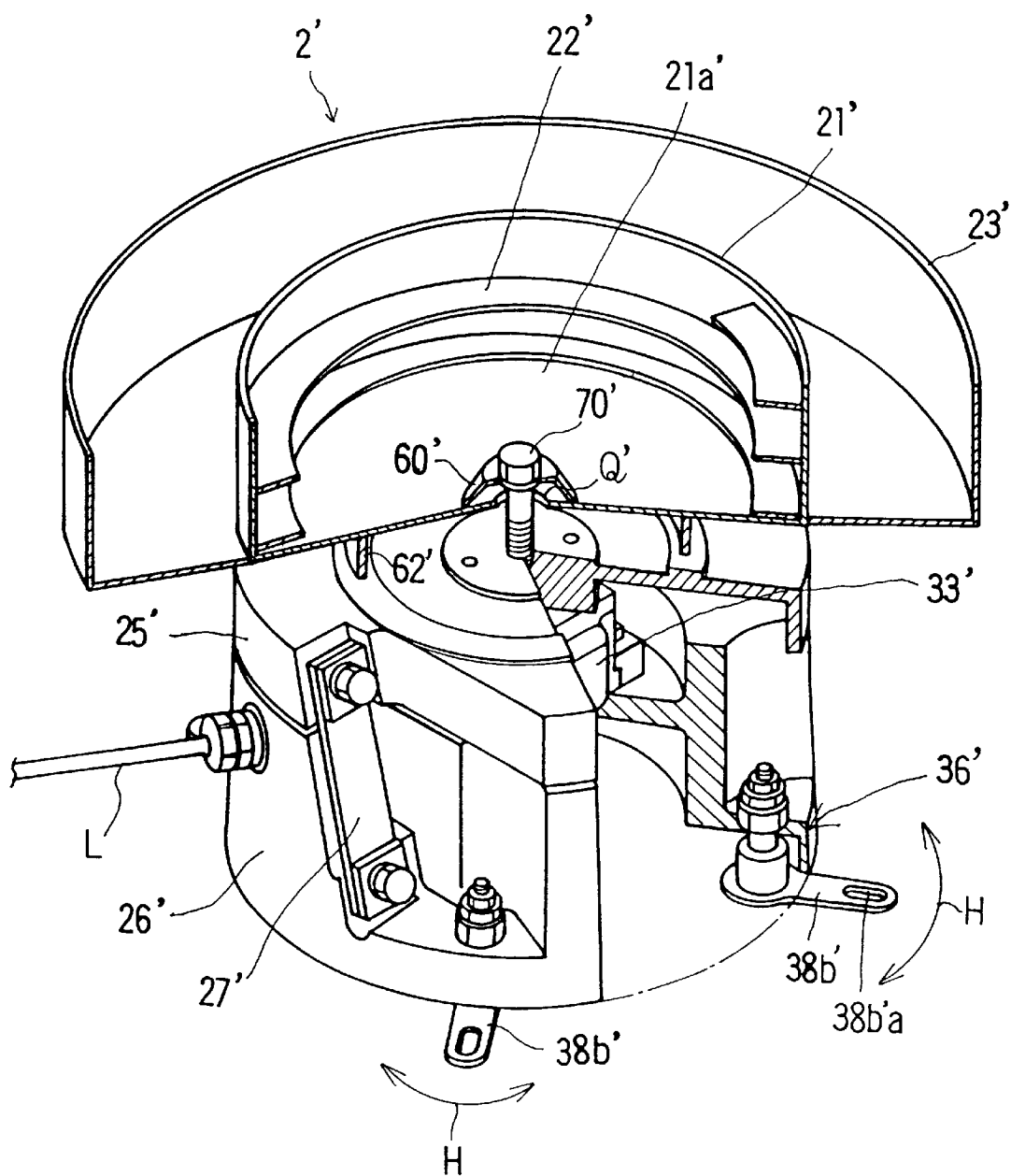
FIG. 16 is a partially broken-away perspective view of a vibratory parts-feeder according to a second embodiment of this invention.
Figure 17:
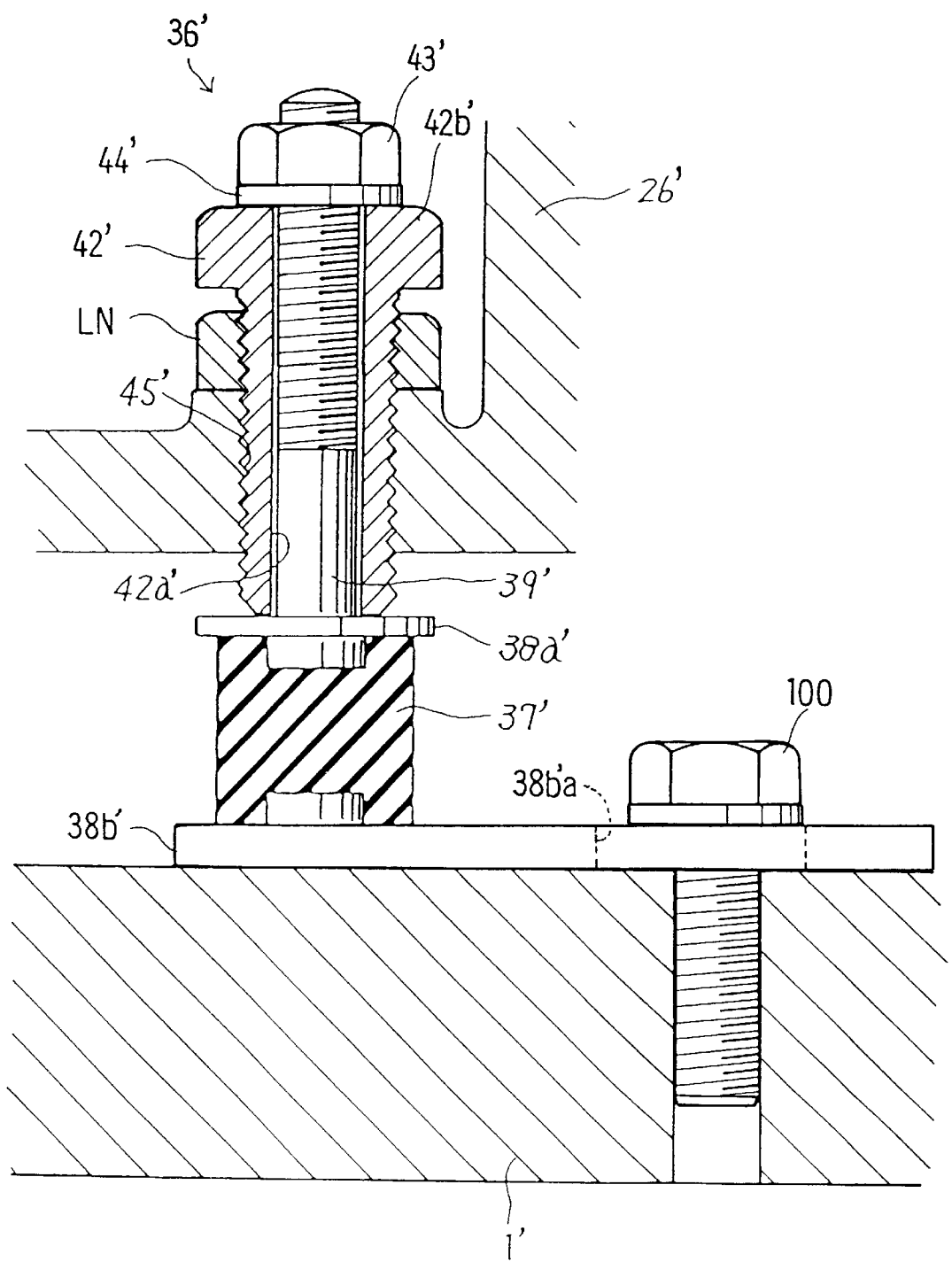
FIG. 17 is a cross-sectional view of a vibration absorbing device in the vibratory parts-feeder of FIG. 16.
Figure 18:
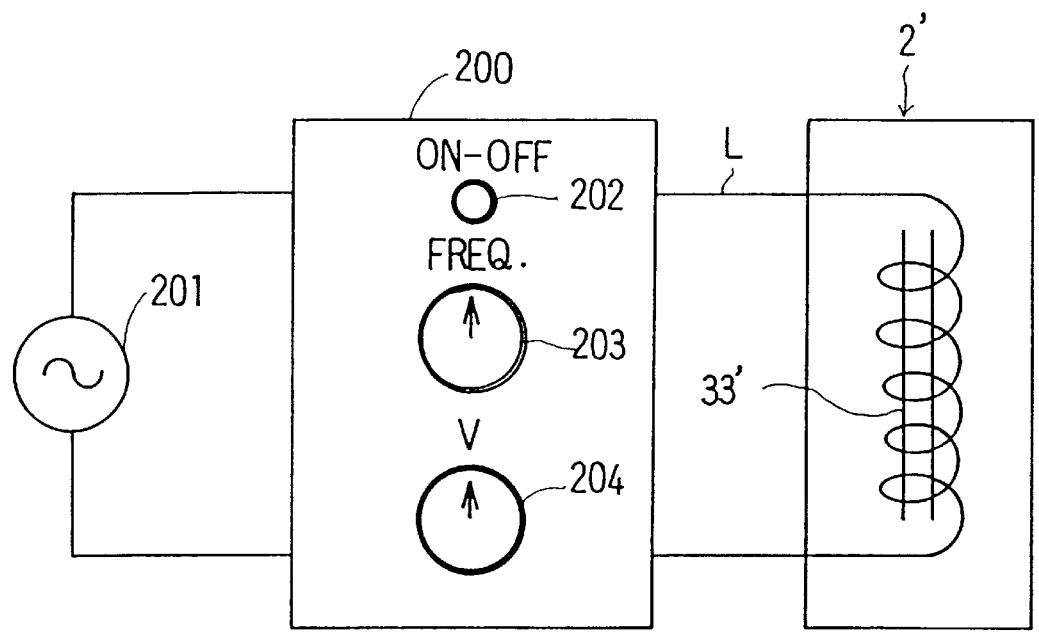
FIG. 18 is a block schematic diagram of the control circuit for the vibratory parts-feeder according to the second embodiment.

Next, a vibratory parts-feeder according to a second embodiment of this invention will be described with reference to FIG. 16 to FIG. 21. In FIG. 16, the vibratory parts-feeder is denoted generally by a reference numeral 2'. Parts which correspond to those in the first embodiment, are denoted by the same reference numerals with prime bowl. The respective ports or portion are somewhat different in construction or shape from those in the first embodiment. Also in this embodiment, the upper frame 25' and the base block 26' are combined with each other by single leaf springs 27' arranged at regular angular intervals. A control unit 200 as shown in FIG. 18 is different in circuit construction from the control circuit E described in the first embodiment. No vibration-detecting pick-up or detector is used or attached to the bowl for this embodiment. The pick-up 108 is attached to the bowl in the first embodiment. The control unit 200 is connected to an AC commercial supply source 201 and includes a frequency convertor or invertor and voltage regulator. The control unit 200 is put into the operative condition with depression of a ON-OFF switch 202. The output is supplied through the lead wire L, which is shown in FIG. 16 also, to the coil 33' of the vibatory parts-feeder 2'. The output frequency is controlled with manual adjustment of a frequency convertor knob 203 and the output voltage is controlled with manual adjustment of a voltage adjusting knob 204.

A vibration absorbing rubber device 36' according to this embodiment will be described particularly with reference to FIG. 17. Parts which correspond to those in the first embodiment are denoted by the same reference numerals with a prime mark. Next, only different parts or portions in the vibration absorbing rubber device 36' will be described with reference to FIG. 17.

In this embodiment, a lock nut LN is engaged with the rod-like bolt 39' between the upper nut 43' and the head of the outer bolt 42'. After the level of the base block 26' is adjusted by the level adjusting bolt 42', the lock nut LN is fastened to prevent the bolt 42' from rotating during the vibration of the parts-feeder 2'. A lower metal plate 38b' fixed to the lower surface of the vibration absorbing rubber 37' is different in shape from the metal plate 38b of the first embodiment. A lower bolt is not formed integrally with the lower metal plate 38b', in contrast to the first embodiment. It is elongated outwards and an oblong hole 38b'a is formed in the elongated portion of the metal plate 38b'. Before the upper lock nut 43' is fastened, the lower metal plate 38b' can be rotated around the rod-like bolts 39'.

Thus, as shown in FIG. 16, the elongated lower metal plate 38b' is rotatable in the clockwise and anti-clockwise directions as shown by the arrow H. The lower metal plate 38b' is rotated to a predetermined position on a base plate 1' and the oblong hole 38b'a is aligned with a threaded hole 41', made in the base plate 1' and a bolt 100 is inserted into the oblong hole 38b'a and screwed to the threaded hole 41'. Thus, the vibratory parts-feeder 2' is fixed to the base plate 1'. The mounting freedom of the vibratory parts-feeder 2' on a base plate or ground is more than that of the first embodiment. Of course, the bowl 21' is rotatable around the bolt 70' inserted through the central opening Q' of the bottom 21a', before the bolt 70' is fastened.

Figure 19:
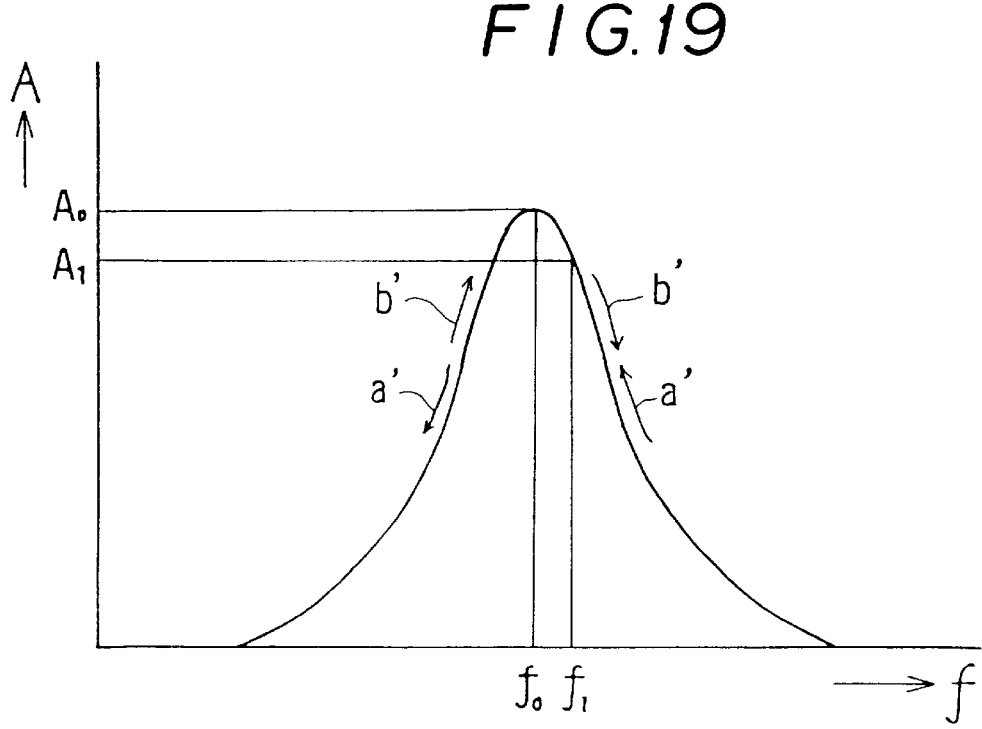
FIG. 19 is a graph for explaining operations of the control circuit for the second embodiment.
Figure 20:
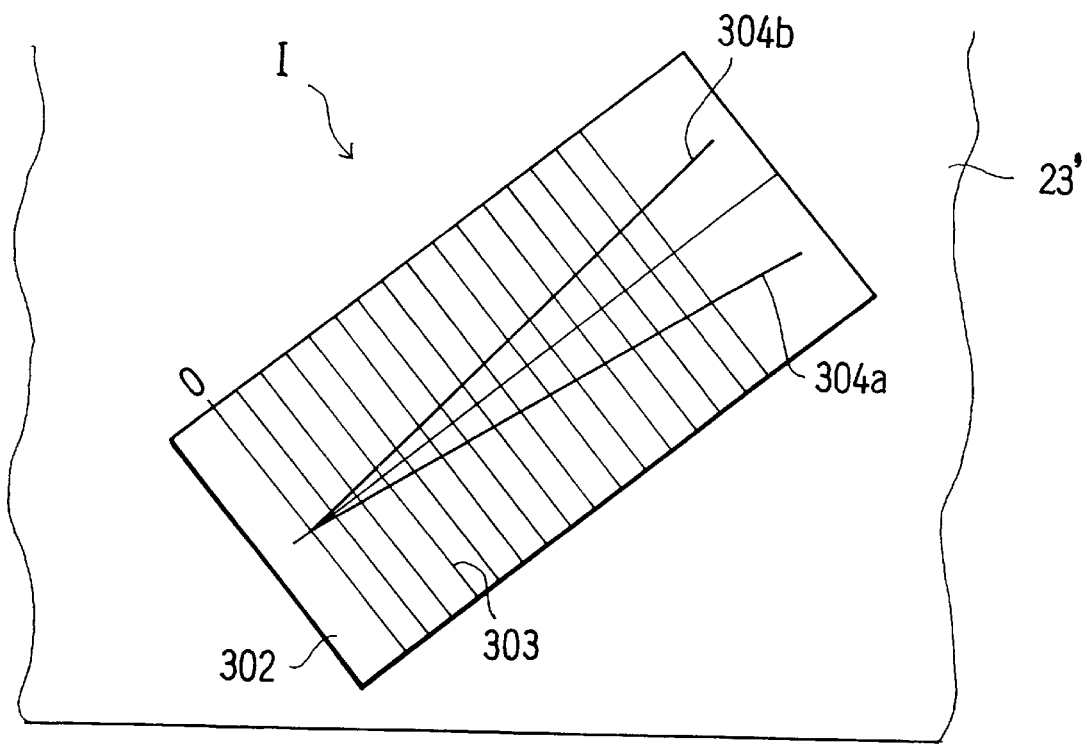
FIG. 20 is a front view of an amplitude indicator attached to the bowl of the vibratory parts-feeder according to the second embodiment of this invention.
Figure 21:
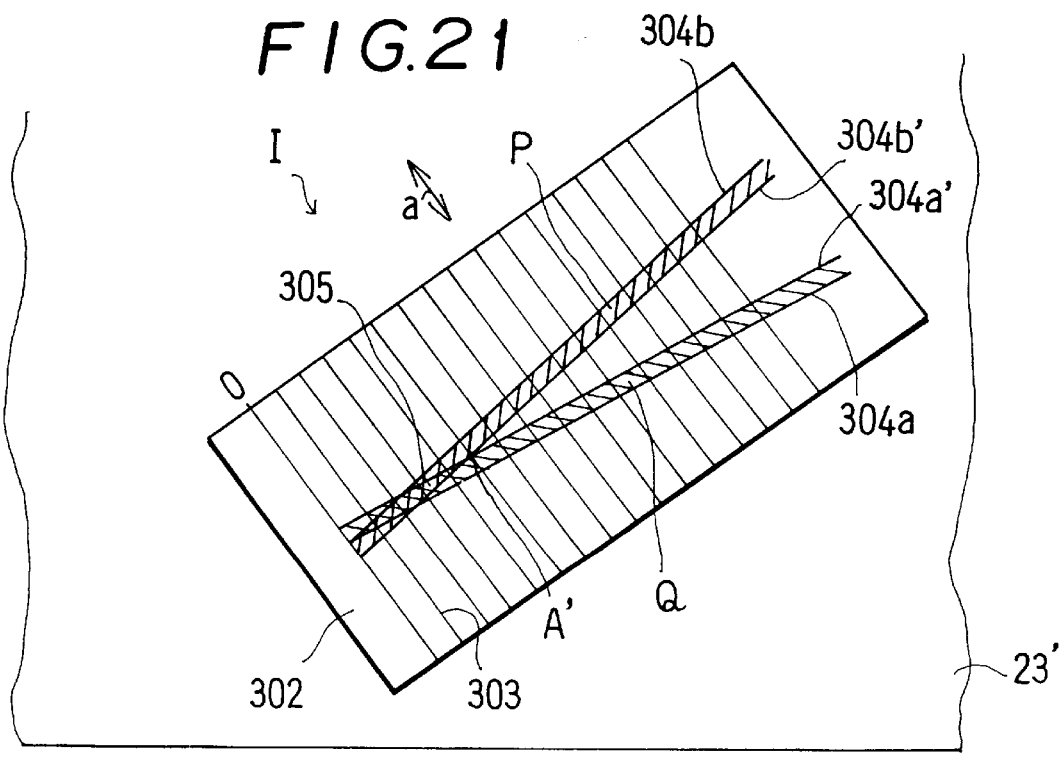
FIG. 21 is a front view of the amplitude indicator of FIG. 20 during vibration of the bowl.

Next, operation of the vibratory parts-feeder 2' will be described with reference to FIG. 18 to FIG. 21. The On-Off switch 202 is depressed to drive the control unit 200. The bowl 21' starts to be torsionally vibrated. The user adjusts the frequency knob 203. The frequency of the output is changed with the adjustment. FIG. 19 shows the relationship between the output frequency f and the amplitude A of the bowl 21' of the vibratory parts-feeder 2'. With the rotation of the frequency knob 203, the amplitude A of the bowl 21' changes with the output frequency f in the manner as shown in FIG. 19. When the output frequency f is decreased with the adjustment, the amplitude A of the bowl 21' changes along the arrow a' shown in FIG. 19. The amplitude A becomes maximum $A_0$ at the frequency $f_0$. It is the resonant frequency of this vibratory system or when the output frequency f is increased, the amplitude A changes along the arrow b' in FIG. 19. The user measures the amplitude A of the bowl, for example, with an amplitude indicator I as shown in FIG. 20. The indicator I is made of paper, and it is attached to the outer surface of the pocket 23' integrally formed with the bowl 21', with adhesive. In the indicator I, scale lines 303 are printed at regular pitches on the paper 302, and further two indicating lines 304a, 304b in V shape are printed on the paper 302, intersecting the scale lines 303. The indicator I is so attached that the scale lines 303 are parallel with the direction of the torsional vibration of the bowl. When the bowl is vibrated, the indicating lines 304a' and 304b' seem as bands P and Q as the persistence of the vision, as shown in FIG. 21. The user measures the top end A' of the overlapped bands P and Q. The position of the top end A' is measured with the scale lines 303. Thus, the amplitude A of the bowl can be measured. For example, when the user sets the output frequency at $f_1$, the bowl 21' is vibrated at the amplitude $A_1$. For example, with $\lambda = f_1/f_0 = 1.01$, as a preferable ratio.

Next, the voltage knob 204 is adjusted. The output voltage is decreased or increased. The amplitude A of the bowl 21' is decreased or increased with the adjustment of the voltage knob 204. The voltage knob 204 is set at a desired amplitude $A_1'$. When the parts are loaded into the bowl 21', the amplitude A of the bowl 21' is lowered. Accordingly, the voltage knob 204 is again adjusted to obtain a desired amplitude of the bowl 21'. Thus, the bowl 21' is stably vibrated at the frequency $f_1$ near the resonant frequency $f_0$ and the desired amplitude $A_1'$.

While the preferred embodiments have been described, variations thereto will occur to those skilled in the art within the scope of the present inventive concepts which are delineated by the following claims.

For example, the full-wave rectification is effected in the control apparatus 200 of the second embodiment. However, instead of the full-wave rectification, half-wave rectification may be used in the control apparatus 200. In this case, two leaf springs are preferably used in each set of leaf springs arranged at angular regular intervals because the desired amplitude is larger at the lower frequency and the same leaf spring can be used as in the above embodiment. The standardization of the parts can be thus improved.

What is claimed is:

1. In a vibratory parts-feeder which includes bowl means, a base arranged below said bowl means, plural sets of leaf spring means obliquely arranged at constant angular intervals for combining said bowl means and said base, and an electro-magnet fixed on said base, and in which said bowl means is vibrated torsionally with the energization of said electro-magnet, the improvement residing in said plural sets of leaf spring means consisting of one or two leaf springs, respectively, and a controller is connected to said electro-magnet, said controller comprising;

(a) an AC (Alternating current) to DC (Direct current) convertor connected to an AC power source, (b) a DC to AC convertor connected to said AC to DC convertor and providing an AC output which is supplied to drive said electro-magnet, (c) vibration-detecting means for detecting vibration of said bowl means and for providing an output representative of the vibrations of said bowl means, (d) phase-detecting means for detecting the phase difference between the outputs of said vibration-detecting means and said DC to AC convertor and for providing an output representative of the phase difference, and (e) comparator means for comparing a constant phase value of substantially $\pi/2$ with the output of said phase-detecting means and for providing an output representative of said comparison, and for controlling the frequency of the AC output of said DC to AC convertor with the output of said comparator means and for thereby controlling the frequency of a vibratory force to said bowl means so as to be substantially a resonant frequency of the output of said comparator means.

2. In a vibratory parts-feeder which includes bowl means, a base arranged below said bowl means, plural sets of leaf spring means obliquely arranged at constant angular intervals for combining said bowl means and said base, and an electro-magnet fixed on said base, and in which said bowl means is vibrated torsionally with the energization of said electro-magnet, the improvement residing in said plural sets of leaf spring means consisting of one or two leaf springs, respectively, and a controller is connected to said electro-magnet, said controller comprising;

(a) an AC (Alternating current) to DC (Direct current) convertor connected to an AC power source, (b) a DC to AC convertor connected to said AC to DC convertor and providing an AC output which is supplied to drive said electro-magnet, (c) vibration-detecting means for detecting vibration of said bowl means and for providing an output representative of the vibrations of said bowl means, (d) phase-detecting means for detecting the phase difference between the output of said vibration-detecting means and said DC to AC convertor and for providing an output representative of the phase difference, (e) first comparator means for comparing a constant phase value of substantially $\pi/2$ with the output of said phase-detecting means and for providing an output representative of said comparison, and (f) second comparator means for comparing the output of said vibration-detecting means with a predetermined amplitude and for controlling the frequency of the AC output of said DC to AC convertor with the output of said first comparator means and for thereby controlling the frequency of a vibratory force to said bowl so as to be substantially a resonant frequency with the output of said first comparator means, and for also thereby controlling the amplitude of said bowl so as to be substantially equal to said predetermined amplitude of the level of the DC output of said AC to DC convertor.

3. In a vibratory parts-feeder which includes bowl means, a base arranged below said bowl means, plural sets of leaf spring means obliquely arranged at constant angular intervals for combining said bowl means and said base, and an electro-magnet fixed on said base, and in which said bowl means is vibrated torsionally with the energization of said electro-magnet, the improvement residing in said plural sets of leaf spring means consisting of one or two leaf springs, respectively, and a controller is connected to said electro-magnet, said controller comprising; (A) drive frequency-converting means connected to an AC power source for controlling the driving frequency for said electro-magnet so as to be nearly equal to a resonant frequency with adjustment of said frequency-converting means, and (B) output voltage regulating means for controlling the amplitude of said bowl means as to be nearly equal to a desired amplitude of said output voltage regulating means as adjusted, said bowl means including a bowl having a low-conical-shaped bottom, a movable frame to which upper ends of said leaf spring means are fixed, and fixing means for fixing said bowl to said movable frame, said fixing means comprising a fixing block having a central through hole and a conical recess at its lower end, and a bolt, the conical angle of said conical recess being smaller than that of said conical shaped bottom, and said bolt received through said central through hole of the fixing block and a central opening of said bottom of the bowl and screwed into a threaded hole provided in said movable frame.

4. A vibratory parts-feeder according to claim 3, in which said bowl means further includes a cylindrical member fixed to the outer surface of said bottom and being concentric with said central opening of the bottom, and the lower end of said cylindrical member contacts with the upper surface of said movable frame over a fastening force of said bolt into said threaded hole of said movable frame.

5. A vibratory parts-feeder according to claim 3, in which said base is supported on a ground surface by vibration-absorbing devices which are arranged at regular angular intervals and said devices are comprised of a rubber body, a rod-like bolt fixed to an upper surface of said rubber body, and a level-adjusting bolt having a central through hole and screwed through a threaded through hole made in said base, respectively, for leveling said base relative to the ground surface with rotation of said level-adjusting bolt, and a nut screwed on to a projected portion of said rod-like bolt fastened to said level-adjusting bolt.

6. A vibratory parts-feeder according to claim 5, in which a metal plate is fixed to a lower surface of said rubber body and a lower rod-like bolt is fixed to said metal plate in alignment with said upper rod-like bolt.

7. A vibratory parts-feeder according to claim 5, in which an elongated metal plate is fixed to a lower surface of said rubber body, and an oblong hole is provided in an outer portion of said elongated metal plate.

8. A vibratory parts-feeder according to claim 1, in which said bowl means includes a bowl having a low-conical-shaped bottom, a movable frame to which upper ends of said leaf spring means are fixed, and fixing means for fixing said bowl to said movable frame, said fixing means comprising a fixing block having a central through hole and a conical recess at its lower end, and a bolt, the conical angle of said conical recess being smaller than that of said conical shaped bottom, and said bolt received through said central through hole of the fixing block and a central opening of said bottom of the bowl and screwed into a threaded hole provided in said movable frame.

9. A vibratory parts-feeder according to claim 8, in which said bowl means further includes a cylindrical member fixed to the outer surface of said bottom and being concentric with said central opening of the bottom, and the lower end of said cylindrical member contacts with the upper surface of said movable frame over a fastening force of said bolt into said threaded hole of said movable frame.

10. A vibratory parts-feeder according to claim 1, in which said base is supported on a ground surface by vibration-absorbing devices which are arranged at regular angular intervals and said devices are comprised of a rubber body, a rod-like bolt fixed to an upper surface of said rubber body, and a level-adjusting bolt having a central through hole and screwed through a threaded through hole made in said base, respectively, for leveling said base relative to the ground surface with rotation of said level-adjusting bolt, and a nut screwed on to a projected portion of said rod-like bolt fastened to said level-adjusting bolt.

11. A vibratory parts-feeder according to claim 10, in which a metal plate is fixed to a lower surface of said rubber body and a lower rod-like bolt is fixed to said metal plate in alignment with said upper rod-like bolt.

12. A vibratory parts-feeder according to claim 10, in which an elongated metal plate is fixed to a lower surface of said rubber body, and an oblong hole is provided in an outer portion of said elongated metal plate.

13. A vibratory parts-feeder according to claim 2, in which said bowl means includes a bowl having a low-conical-shaped bottom, a movable frame to which upper ends of said leaf spring means are fixed, and fixing means for fixing said bowl to said movable frame, said fixing means comprising a fixing block having a central through hole and a conical recess at its lower end, and a bolt, the conical angle of said conical recess being smaller than that of said conical shaped bottom, and said bolt received through said central through hole of the fixing block and a central opening of said bottom of the bowl and screwed into a threaded hole provided in said movable frame.

14. A vibratory parts-feeder according to claim 13, in which said bowl means further includes a cylindrical member fixed to the outer surface of said bottom and being concentric with said central opening of the bottom, and the lower end of said cylindrical member contacts with the upper surface of said movable frame over a fastening force of said bolt into said threaded hole of said movable frame.

15. A vibratory parts-feeder according to claim 2, in which said base is supported on a ground surface by vibration-absorbing devices which are arranged at regular angular intervals and said devices are comprised of a rubber body, a rod-like bolt fixed to an upper surface of said rubber body, and a level-adjusting bolt having a central through hole and screwed through a threaded through hole made in said base, respectively, for leveling said base relative to the ground surface with rotation of said level-adjusting bolt, and a nut screwed on to a projected portion of said rod-like bolt fastened to said level-adjusting bolt.

16. A vibratory parts-feeder according to claim 15, in which a metal plate is fixed to a lower surface of said rubber body and a lower rod-like bolt is fixed to said metal plate in alignment with said upper rod-like bolt.

17. A vibratory parts-feeder according to claim 15, in which an elongated metal plate is fixed to a lower surface of said rubber body, and an oblong hole is provided in an outer portion of said elongated metal plate.

* * * * *